(12) United States Patent
Mogami et al.

(10) Patent No.: US 12,432,447 B2
(45) Date of Patent: Sep. 30, 2025

(54) EVALUATING APPARATUS, EVALUATING METHOD, MANUFACTURING METHOD OF IMAGING UNIT, AND STORAGE MEDIUM

(71) Applicant: CANON KABUSHIKI KAISHA, Tokyo (JP)

(72) Inventors: Tomomi Mogami, Kanagawa (JP); Koichi Washisu, Tokyo (JP); Hirotaka Shindo, Tokyo (JP); Tamaki Negishi, Tokyo (JP); Ryuichiro Yasuda, Tokyo (JP); Kosuke Kiyamura, Kanagawa (JP); Toru Matsumoto, Kanagawa (JP); Yu Narita, Kanagawa (JP); Go Naito, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 178 days.

(21) Appl. No.: 18/359,987

(22) Filed: Jul. 27, 2023

(65) Prior Publication Data
US 2023/0370722 A1    Nov. 16, 2023

Related U.S. Application Data

(63) Continuation of application No. PCT/JP2022/000140, filed on Jan. 5, 2022.

(30) Foreign Application Priority Data

Feb. 10, 2021  (JP) ................... 2021-019967
Sep. 22, 2021  (JP) ................... 2021-153817

(51) Int. Cl.
*G03B 43/00*    (2021.01)
*H04N 17/00*    (2006.01)
(Continued)

(52) U.S. Cl.
CPC ................. *H04N 23/6811* (2023.01)

(58) Field of Classification Search
CPC .... H04N 23/6811; H04N 17/00; H04N 23/73; G03B 43/00
See application file for complete search history.

(56) References Cited

U.S. PATENT DOCUMENTS

2014/0331774 A1* 11/2014 Ohara ................. G03B 43/00
                                                        73/662
2020/0351444 A1* 11/2020 Cha ....................... H04N 23/68

FOREIGN PATENT DOCUMENTS

CN    104853179 A    8/2015
JP    2012-010406 A  1/2012
(Continued)

OTHER PUBLICATIONS

The above foreign documents # 1-3 and 5 were cited in an International Search Report issued on Mar. 29, 2022 a copy of which is enclosed, that issued in PCT Application No. PCT/JP2022/000140.
(Continued)

*Primary Examiner* — Ahmed A Berhan
(74) *Attorney, Agent, or Firm* — Cowan, Liebowitz & Latman, P.C.

(57) ABSTRACT

An evaluating apparatus is configured to evaluate image stabilizing performance of an imaging unit around an optical axis. The evaluating apparatus includes an object disposed to face the imaging unit, the object having a first feature point at a position different from the optical axis of the imaging unit, an excitation unit configured to excite the imaging unit, and an evaluating unit configured to evaluate an image of the object captured by the imaging unit that is being excited by the excitation unit.

8 Claims, 25 Drawing Sheets

(51) Int. Cl.
*H04N 23/68* (2023.01)
*H04N 23/73* (2023.01)

(56) References Cited

FOREIGN PATENT DOCUMENTS

| | | |
|---|---|---|
| JP | 2013-025267 A | 2/2013 |
| WO | 2008/078537 A1 | 7/2008 |
| WO | 2013/076964 A1 | 5/2013 |

OTHER PUBLICATIONS

PCT/IB/338 (PCT Notification of Transmittal of Translation of the International Preliminary Report on Patentability) mailed Aug. 24, 2023; PCT/IB/373 (PCT International Preliminary Report on Patentability) mailed Aug. 15, 2023; PCT/ISA/237 (PCT Written Opinion of the International Searching Authority) mailed Mar. 29, 2022.

* cited by examiner

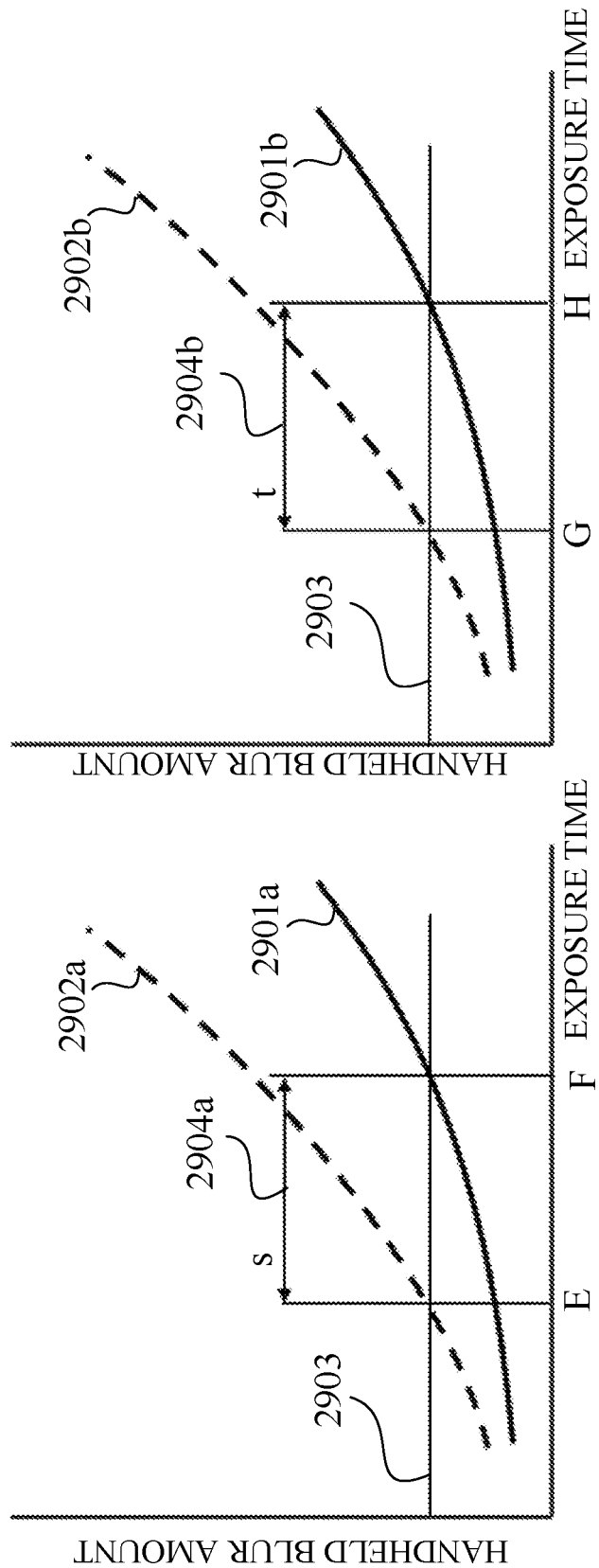

EVALUATING APPARATUS, EVALUATING METHOD, MANUFACTURING METHOD OF IMAGING UNIT, AND STORAGE MEDIUM

CROSS-REFERENCE TO RELATED APPLICATIONS

This application is a Continuation of International Patent Application No. PCT/JP2022/000140, filed on Jan. 5, 2022, which claims the benefit of Japanese Patent Applications Nos. 2021-019967, filed on Feb. 10, 2021, and 2021-153817, filed on Sep. 22, 2021, both of which are hereby incorporated by reference herein in their entirety.

BACKGROUND

Technical Field

One of the aspects of the embodiments relates to an evaluating apparatus configured to evaluate the image stabilizing performance of an imaging unit.

Description of Related Art

PCT International Publication No. WO 2013/076964 discloses a measuring apparatus configured to measure an effect of an image stabilizing function of a camera (imaging unit) to be measured by imaging a chart with the camera to be measured that is fixed onto an excitation table (vibrating table) of an excitation apparatus (vibrating apparatus), and by analyzing a resulting image using a computer.

However, the measuring apparatus disclosed in WO 2013/076964 cannot evaluate the image stabilizing function around the optical axis of the imaging unit with high accuracy.

SUMMARY

An evaluating apparatus according to one aspect of the embodiment is configured to evaluate image stabilizing performance of an imaging unit around an optical axis. The evaluating apparatus includes an object disposed to face the imaging unit, the object having a first feature point at a position different from the optical axis of the imaging unit, an excitation unit configured to excite the imaging unit, and an evaluating unit configured to evaluate an image of the object captured by the imaging unit that is being excited by the excitation unit. An evaluating method and a manufacturing method of an imaging unit corresponding to the above evaluating apparatus also constitute another aspect of the disclosure. A non-transitory computer-readable storage medium storing a program that causes a computer to execute the above control method also constitute another aspect of the disclosure.

Further features of the disclosure will become apparent from the following description of embodiments with reference to the attached drawings.

BRIEF DESCRIPTION OF THE DRAWINGS

FIGS. 29A and 29B illustrate image stabilizing performance evaluation graphs according to the fifth embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
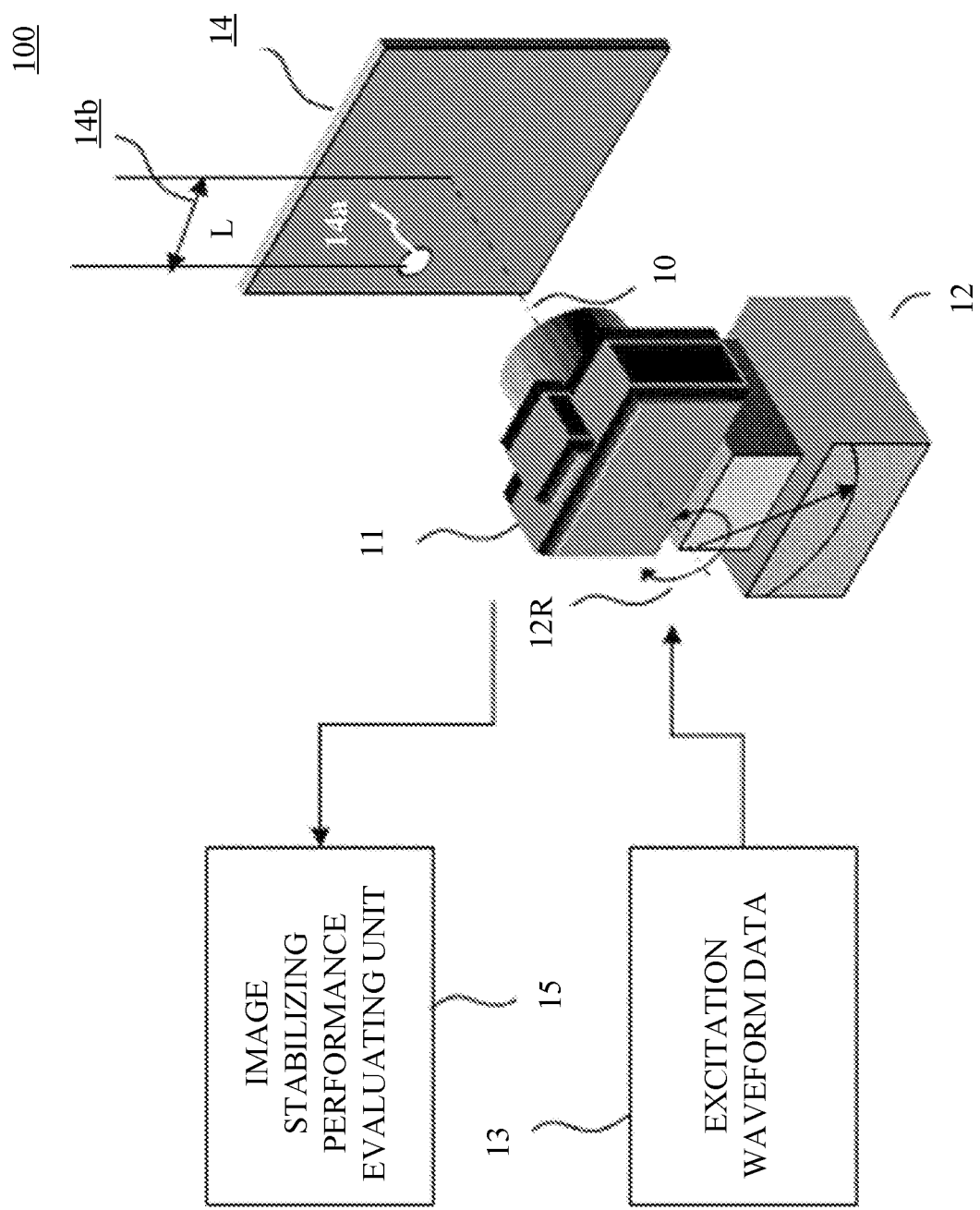
FIG. 1 is a perspective view of an evaluating apparatus according to a first embodiment.

A description will be given of a first embodiment according to the present disclosure. FIG. 1 is a perspective view of an evaluating apparatus 100 configured to execute a camera shake amount measuring method (blur evaluating method) according to this embodiment and evaluates an effect of an image stabilizing function. Focusing on the fact that a blur of the imaging unit around the optical axis causes image deterioration, this embodiment and a second embodiment described below provide an image stabilizing performance evaluating method in the direction around the optical axis and evaluate the image stabilizing performance with higher accuracy. A description will now be given of a method for evaluating the image stabilizing performance against a blur around the optical axis of the imaging unit, which has not been subject to evaluation in prior art.

A measurement camera (imaging unit) 11 is fixed to an excitation table (excitation unit or vibrating unit) 12, and the excitation table 12 is rotationally excited (vibrated) about the optical axis 10 of the measurement camera 11 in an arrow 12R direction (rotating direction). The excitation table 12 is driven based on excitation waveform data (EW data) 13. The excitation waveform data 13 has an average model blur waveform in a case where a photographer holds the measurement camera 11 and captures an image. The measurement camera 11 is disposed to face (oppose) a chart (object) 14 having a point image (first feature point) 14a. Image data (object image) of the chart 14 captured by the measurement camera 11 is input to image stabilizing performance evaluating unit (evaluating unit) 15. In this embodiment, the point image 14a is provided at a peripheral position distant by a distance L (arrow 14b) from the center of the chart 14 (the optical axis 10 of the measurement camera 11, that is, the center of the imaging composition of the measurement camera 11). That is, the chart 14 has the point image 14a at a position different from the optical axis 10 of the measurement camera 11 (a position not at the center of the imaging composition of the measurement camera 11).

Figure 2:
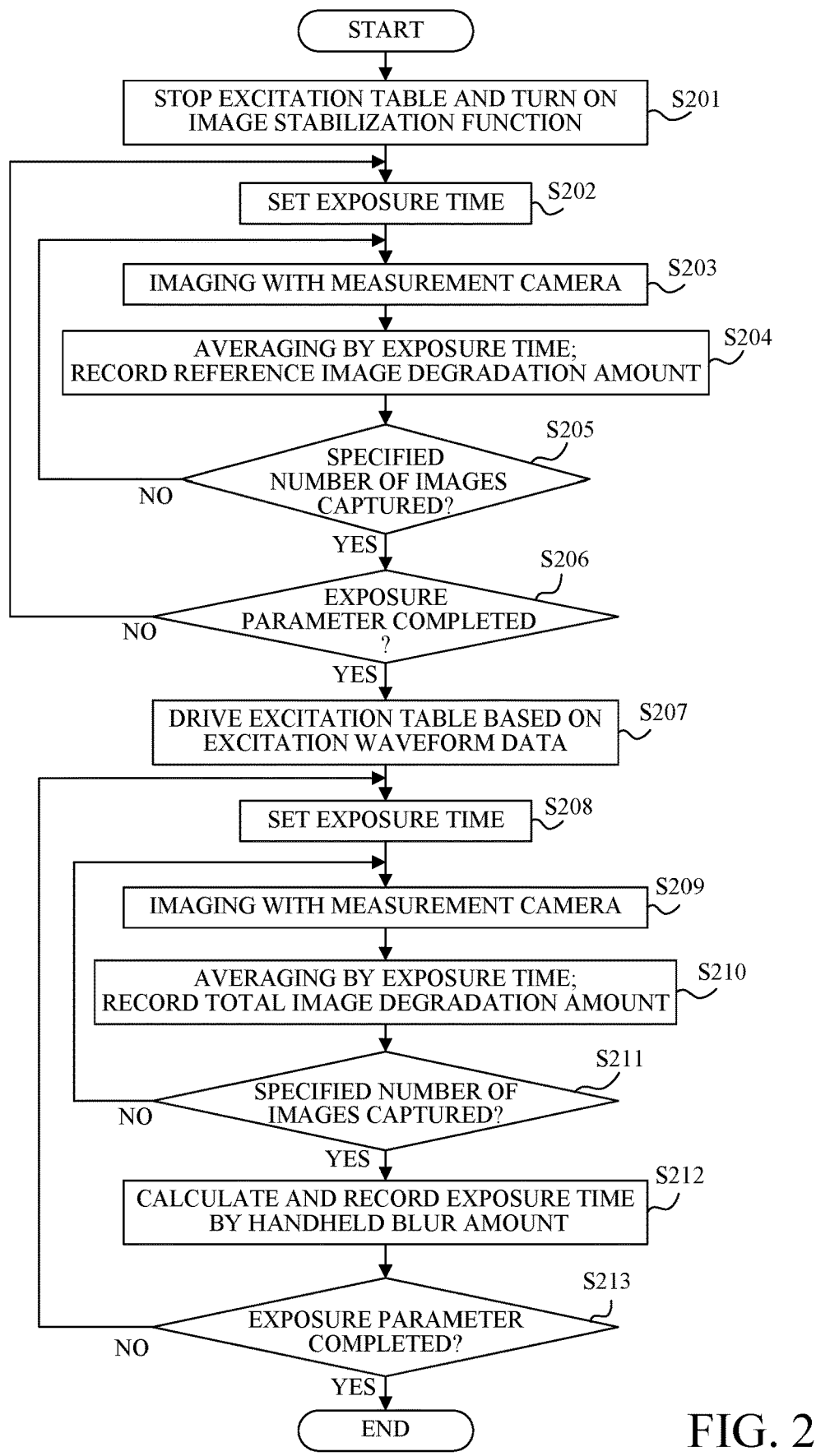
FIG. 2 is a flowchart of a blur evaluating method according to the first embodiment.

A description will be given of the image stabilizing performance evaluation of the measurement camera 11. FIG. 2 is a flowchart of a blur evaluating method for evaluating the image stabilizing performance of the measurement camera 11. Each step in FIG. 2 is mainly executed by the image stabilizing performance evaluating unit 15.

Figure 3A:
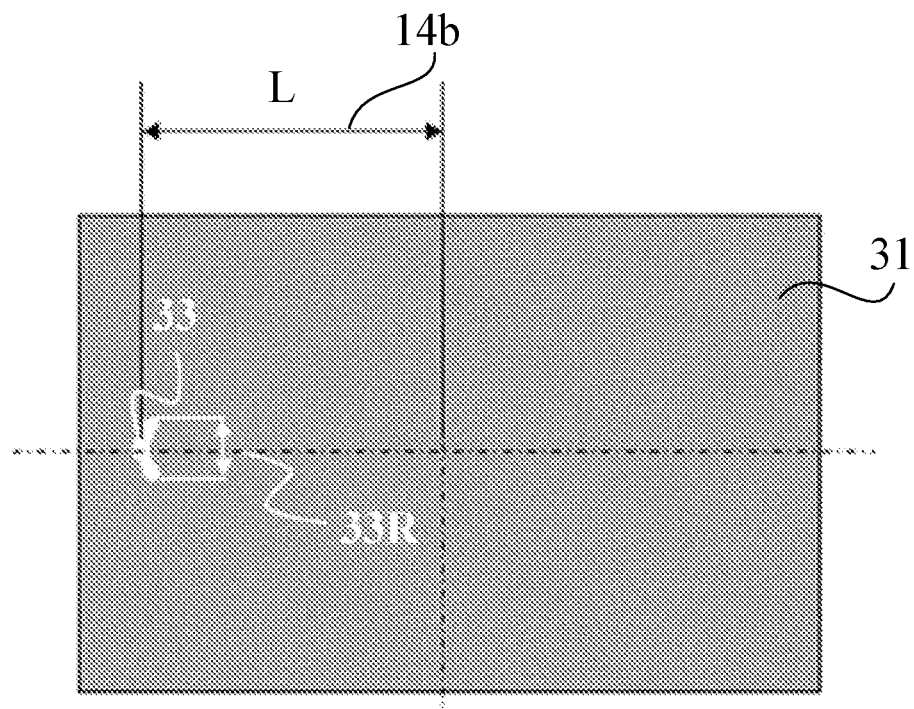
FIGS. 3A and 3B illustrate locus images in the first embodiment.
Figure 3B:
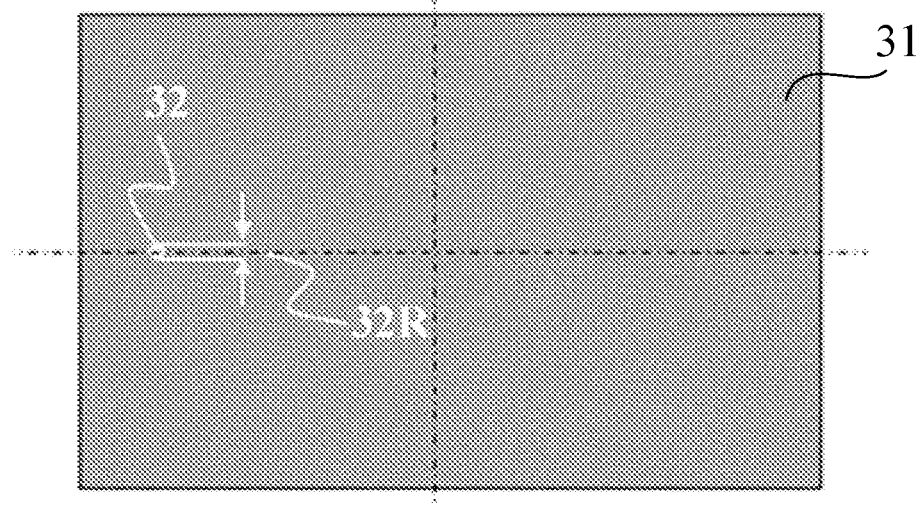

First, in step S201, driving of the excitation table 12 is stopped and the image stabilizing function of the measurement camera 11 is turned on. Next, in step S202, the exposure time of the measurement camera 11 is set. For example, in a case where a focal length of an optical system (imaging lens) of the measurement camera 11 is 100 mm and the image sensor has a size of a full-size format (36 mm wide and 24 mm long), the initial exposure time is set to $\frac{1}{100}$ seconds. Next, in step S203, the measurement camera 11 captures the chart 14 for the set exposure time. Next, in step S204, the image stabilizing performance evaluating unit 15 obtains a image degradation amount in the exposure time set for the measurement camera 11. This corresponds to the step of determining a image degradation amount 32R from a point image 32 of a moving locus illustrated in FIG. 3B. The purpose is to average and acquire a reference image degradation amount, which is image degradation peculiar to the measurement camera 11, for each exposure time set in step S202. The image degradation amount 32R is obtained from a single image (temporally identical object image) captured in step S203. That is, this boke amount is not a image degradation amount that is obtained by continuously capturing a plurality of images and by selecting a point image change of each image at that time or the combined image.

Next, in step S205, the image stabilizing performance evaluating unit 15 determines whether or not the measurement camera 11 has already captured the specified number of images (such as 10 images). Steps S203 and S204 are repeated until the measurement camera 11 captures the specified number of images. On the other hand, in a case where the measurement camera 11 has captured the specified number of images, the flow proceeds to step S206.

In step S206, the image stabilizing performance evaluating unit 15 determines whether or not the exposure time to be measured as the exposure parameter has been completed. Steps S202 to S205 are repeated until the exposure time to be measured is completed. On the other hand, in a case where the exposure time to be measured has been completed, the flow proceeds to step S207. The exposure time is set by increasing the exposure time each time the flowchart loops, and exiting step S206 at a predetermined exposure time ($\frac{1}{2}$ seconds or the like).

In step S207, the evaluating apparatus 100 drives the excitation table 12 based on the excitation waveform data 13. Next, in step S208, the exposure time is set similarly to step S202. Next, in step S209, similarly to step S203, the measurement camera 11 captures the chart 14 for the set exposure time. Next, in step S210, the image stabilizing performance evaluating unit 15 obtains an total image degradation amount in the exposure time set in the measurement camera 11. This corresponds to the step of determining an total image degradation amount 33R from a handheld blur locus 33 illustrated in FIG. 3A in the blurred state, and the total image degradation amount is acquired through averaging for each exposure time set in step S208. The image degradation amount 33R is obtained from a single image (temporally identical object image) captured in step S209. That is, this image degradation amount is not a image degradation amount that is obtained by continuously capturing a plurality of images and by selecting a point image change of each image at that time or the combined image.

Next, in step S211, the image stabilizing performance evaluating unit 15 determines whether or not the measurement camera 11 has already captured the specified number of images (such as 100 images) for the same exposure time. Steps S209 and S210 are repeated until the measurement camera 11 captures the specified number of images. On the other hand, in a case where the measurement camera 11 has captured the specified number of images, the flow proceeds to step S212. Since the excitation waveform data 13 has an irregular waveform, an total image degradation amount obtained from the measurement camera 11 has a different value for each measurement. Accordingly, the total image degradation amount can be stabilized by capturing images a plurality of times in the loop of steps S209 to S211 and by averaging them in step S210 to obtain an average total image degradation amount.

In step S212, the image stabilizing performance evaluating unit 15 obtains the difference between the average total image degradation amount recorded in step S210 and the reference image degradation amount recorded in step S204 for each exposure time and records it as a handheld blur amount S. Next, in step S213, similarly to step S206, the image stabilizing performance evaluating unit 15 determines whether or not the exposure time to be measured as an exposure parameter has been completed. Steps S208 to S212 are repeated until the exposure time to be measured has been completed. On the other hand, in a case where the exposure time to be measured has been completed, this flow ends. The exposure time is set by increasing the exposure time each time the flowchart loops, and exiting step S213 at a predetermined exposure time (½ seconds or the like).

Figure 4:
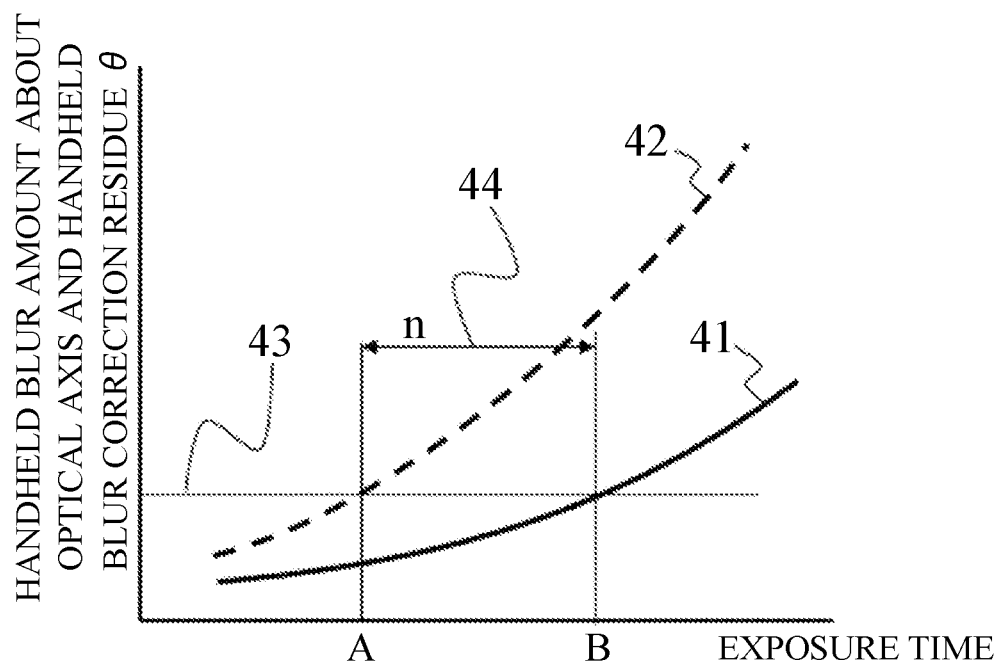
FIG. 4 is a graph of image stabilizing performance evaluation according to the first embodiment.

Based on the handheld blur amount δ obtained in step S212 and the offset L, handheld blur correction residue $\theta=\tan(\delta/L)$ around the optical axis is obtained. The handheld blur correction residue θ around the optical axis is illustrated in the graph of FIG. 4. FIG. 4 is a graph of image stabilizing performance evaluation. In FIG. 4, a horizontal axis represents exposure time, and the exposure time increases toward the right. A vertical axis is the handheld blur amount around the optical axis and the handheld blur correction residue θ. A solid curve 41 represents the handheld blur correction residue curve around the optical axis obtained in step S212 in a case where the image stabilizing function of the measurement camera 11 is turned on. A dashed curve 42 represents a theoretical curve of a handheld blur amount around the optical axis in a case where the image stabilizing function of the measurement camera 11 is turned off. Since the theoretical curve of the handheld blur amount is described in PCT International Publication No. WO 2013/076964, a detailed description thereof will be omitted. Exposure times A and B are read out of the graph, which are located at intersections between the theoretical curve 42 and a predetermined permissible handheld blur amount threshold 43 and between the handheld blur correction residue curve 41 and the predetermined permissible handheld blur amount threshold 43. Here, as an interval n (44) between the exposure times A and B increases, the image stabilizing performance around the optical axis of the camera becomes higher.

Figure 5:
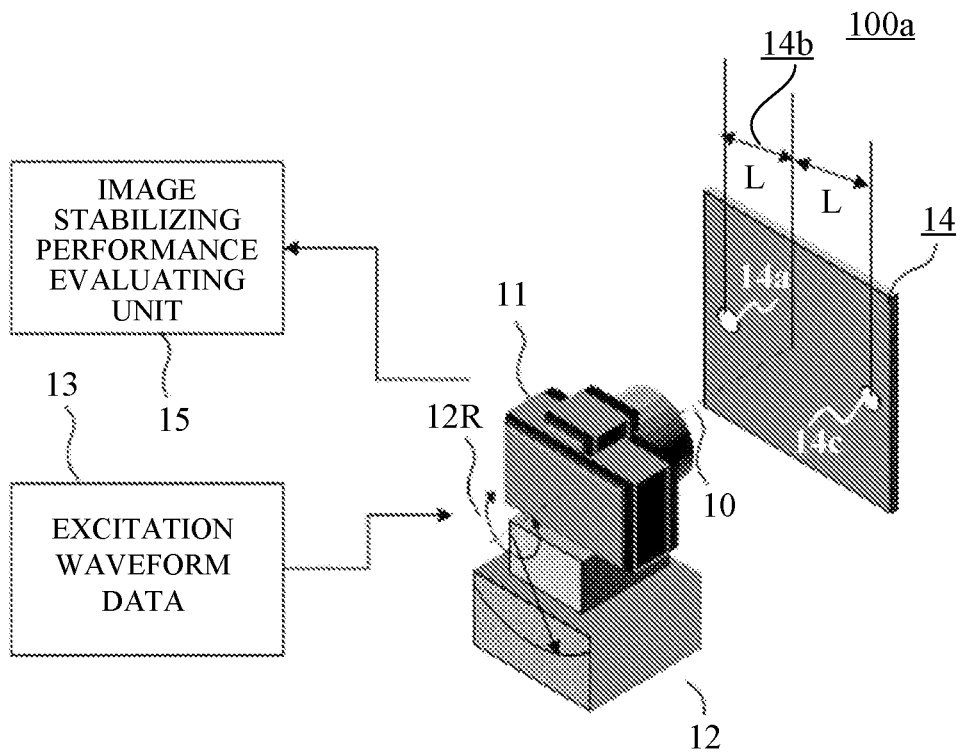
FIG. 5 is a perspective view of another evaluating apparatus according to the first embodiment.
Figure 6A:
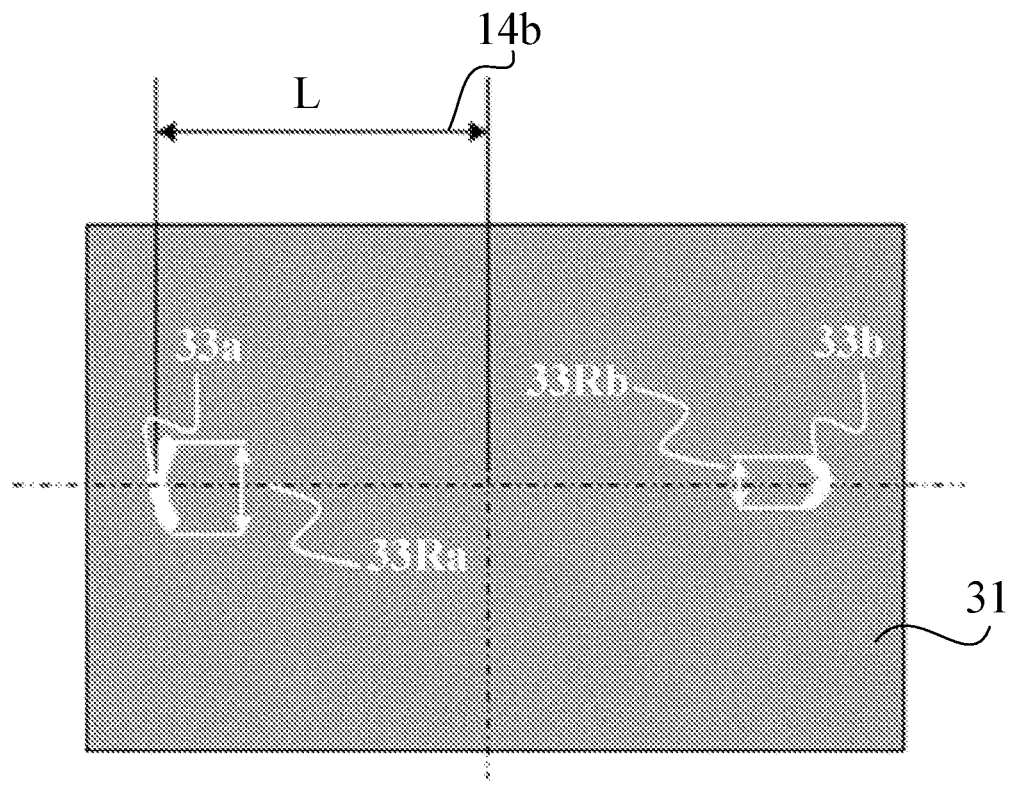
FIGS. 6A and 6B illustrate other locus images in the first embodiment.
Figure 6B:
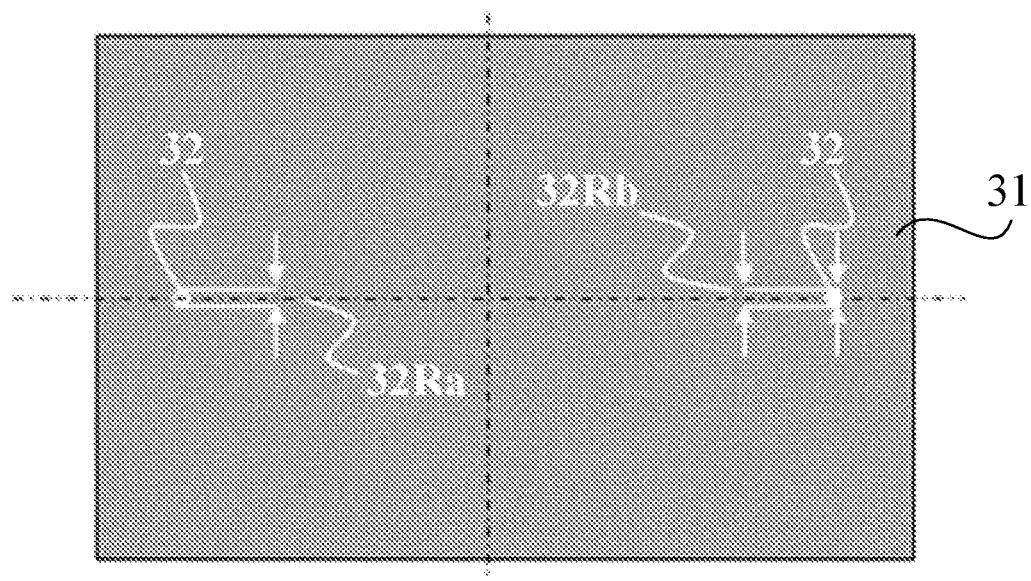

FIG. 5 is a perspective view of another evaluating apparatus 100a according to this embodiment. In the evaluating apparatus 100a, the chart 14 has two feature points, i.e., a point image (first feature point) 14a and a point image (second feature point) 14c in different areas on the left and right sides of the chart 14. FIGS. 6A and 6B are locus images in the evaluating apparatus 100a, and similarly to FIGS. 3A and 3B, total image degradation amounts 33Ra and 33Rb are obtained from handheld blur loci 33a and 33b, respectively. The reason why the handheld blur loci 33a and 33b have different sizes because the optical axis 10 of the measurement camera 11 and the excitation axis of the excitation table 12 shift from each other. Therefore, the total image degradation amounts 33Ra and 33Rb obtained from them are averaged to obtain an total image degradation amount around the optical axis. Thus, averaging locus images of a plurality of points can accurately evaluate the image stabilizing performance around the optical axis.

As described above, each of the evaluating apparatuses 100 and 100a according to this embodiment evaluates the image stabilizing performance of the imaging unit (measurement camera 11) around the optical axis. The evaluating apparatus is disposed to face the imaging unit, and includes an object (chart 14) having a first feature point (point image 14a) and a second feature point (point image 14c) at positions that are not the center of the imaging composition (different from the optical axis 10 or positions located at periphery). The evaluating apparatus includes an excitation unit (excitation table 12) configured to excite the imaging unit, and an evaluating unit (image stabilizing performance evaluating unit 15) configured to evaluate (analyze) an image (single image) of an object (the same object) captured by the imaging unit that is being excited by the excitation unit.

The image stabilizing performance evaluating unit 15 may evaluate handheld blur around the optical axis of the imaging unit left, which is a residue on the image that cannot be corrected (stabilized) by the imaging unit, using a handheld blur average value about each of the first feature point (point image 14a) and the second feature point (point image 14c) provided in different areas. Thereby, image stabilizing performance against a handheld blur around the optical axis can be evaluated. The number of feature points is not limited to two, and may be three or more.

Focusing on the fact that a handheld blur around the optical axis causes image deterioration, this embodiment evaluates image stabilizing performance with high accuracy by executing the image stabilizing performance evaluating method in that direction.

Second Embodiment

Figure 7:
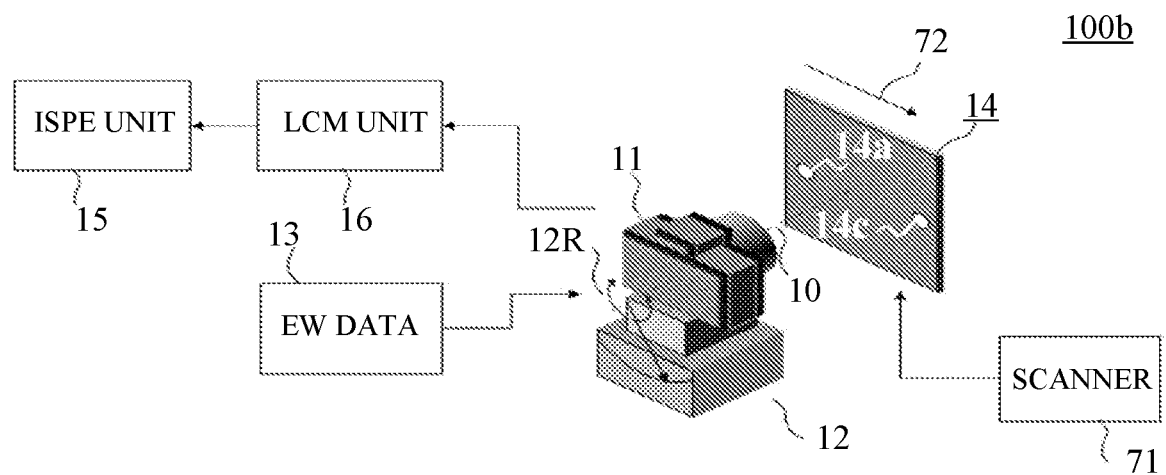
FIG. 7 is a perspective view of an evaluating apparatus according to a second embodiment.

A description will now be given of a second embodiment according to the disclosure. FIG. 7 is a perspective view of an evaluating apparatus 100b configured to execute a camera shake amount measuring method (handheld blur evaluating method) and to evaluate image stabilizing performance according to this embodiment. In the evaluating apparatus 100b, the chart image captured by the measurement camera 11 is input to a locus change measuring unit (LCM unit) 16. The locus change measuring unit 16 obtains a locus of a center of gravity (center-of-gravity locus), which will be described below, from the captured chart image, and sends the result to the image stabilizing performance evaluating unit (ISPE unit) 15.

This embodiment includes at least three characteristics. First, the chart 14 can be scanned in an arrow 72 direction by an actuator (scanner) 71, and the chart 14 is scanned in an arrow 72 direction while the measurement camera 11 photographs the chart 14. Second, the chart 14 has two point images 14a and 14c, and the locus change measuring unit 16 obtains the center of gravity at each locus position of the point images captured by the measurement camera 11. Third, the image stabilizing performance of the rotational handheld blur around the optical axis is evaluated based on a change in a difference between the locus waveform obtained from the point image 14a and the locus waveform obtained from the point image 14c. These characteristics will be described in detail below.

Figure 8:
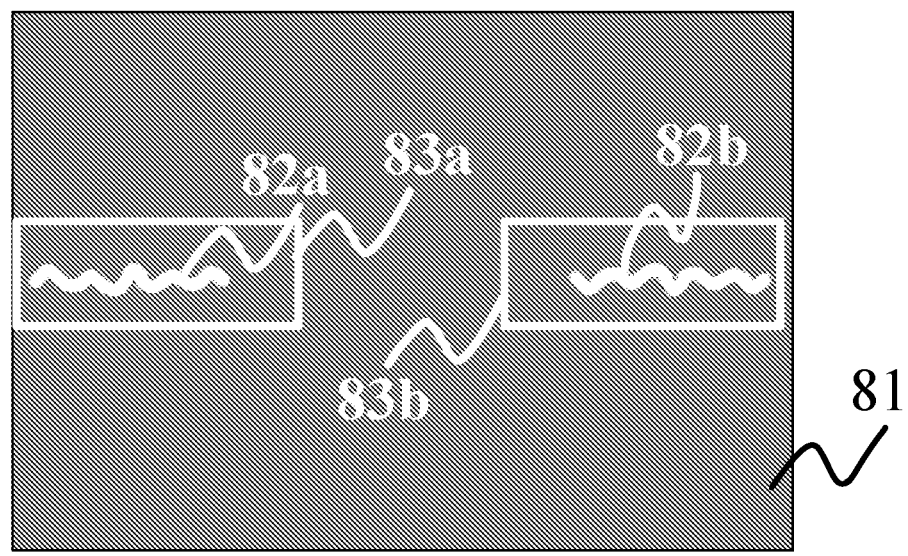
FIG. 8 illustrates locus images in the second embodiment.

FIG. 8 illustrates images (locus images) captured by the measurement camera 11 in a state where camera shake occurs. FIG. 8 illustrates point images 82a and 82b, which have been formed by scanning during imaging the first feature point (point image 14a) and the second feature point (14c) located at positions that are not the center of the image 81. The locus change measuring unit 16 obtains horizontal projections of the point images 82a and 82b and the center of gravity of luminance at each horizontal position.

Figures 9A, 9B:
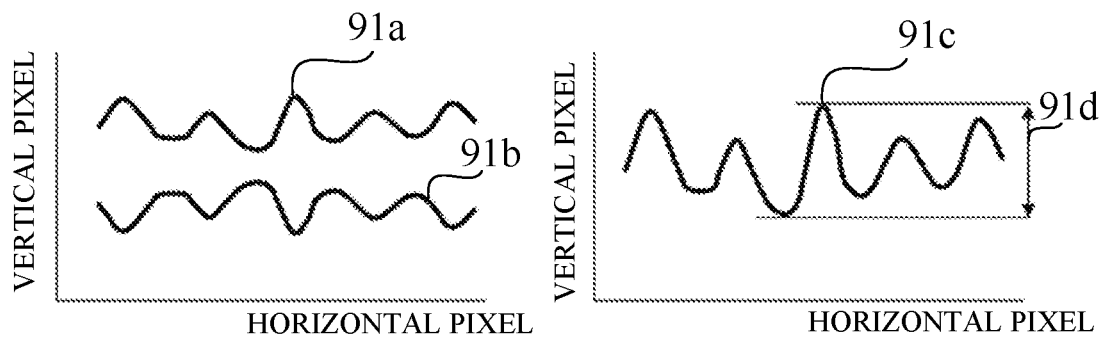
FIGS. 9A and 9B are graphs of center-of-gravity locus extraction in the second embodiment.

FIG. 9A is a graph of center-of-gravity locus extraction binarized after the center of gravity of the image in FIG. 8 is obtained. A horizontal axis represents a horizontal pixel of the image sensor, and a vertical axis represents a vertical pixel of the image sensor. A waveform 91a is a locus waveform (first center-of-gravity locus) obtained by connecting vertical pixel center-of-gravity positions of the point image 82a in respective horizontal pixels. A waveform 91b is a locus waveform (second center-of-gravity locus) obtained by connecting vertical pixel center-of-gravity positions of the point image 82b in respective horizontal pixels. Since the measurement camera 11 is provided with rotational handheld blur around the optical axis, the locus waveforms 91a and 91b have opposite polarities. Therefore, a locus waveform 91c (FIG. 9B), which corresponds to a difference between them, extracts only a rotational handheld blur around the optical axis, and blurs in other directions are canceled out. The image stabilizing performance evaluating unit 15 performs the above processing.

Thus, obtaining each center-of-gravity locus can eliminate the influence of the reference image degradation amount generated by the optical performance and image processing unique to the measurement camera described in the first embodiment. In addition, obtaining the difference between the locus waveforms of the left and right images sandwiching the optical axis 10 can cancel blurs other than around the optical axis, such as angular handheld blur and shift handheld blur, and the image stabilizing function can be evaluated with high accuracy.

Figure 10A:
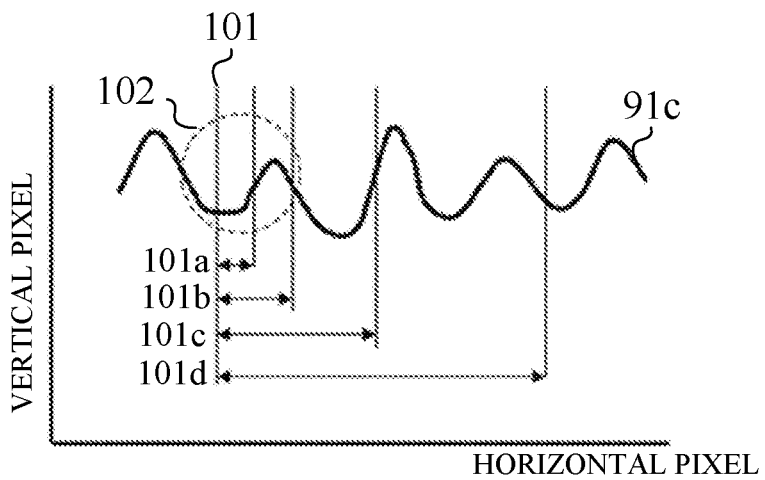
FIGS. 10A to 10D are graphs of blur calculation according to the second embodiment.

A description will be given of a method that is used for the image stabilizing performance evaluating unit 15 to obtain a handheld blur amount for each exposure time of the measurement camera 11. FIG. 10A is a handheld blur calculation graph in which the locus waveform 91c in FIG. 9B is divided into a plurality of calculation areas corresponding to exposure times 101a to 101d of the measurement camera 11. FIG. 10A also illustrates the exposure times 101a to 101d.

Figure 10B:
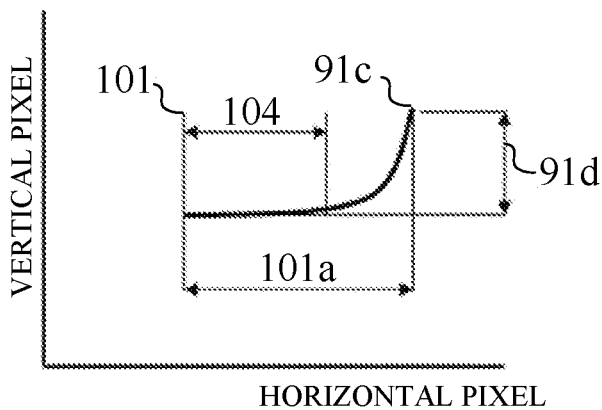

A value obtained by multiplying the imaging magnification of the measurement camera 11 by the constant scanning speed of the chart 14 is the image plane speed on the image sensor of the measurement camera 11. By dividing the image plane speed by the pixel size of the image sensor, the number of moving pixels per time (pixel speed) can be obtained. Therefore, by multiplying the exposure time (such as 1/60 seconds) by the pixel speed, the number of moving pixels per exposure time can be obtained, so the number of pixels on the horizontal axis in FIG. 10A can be associated with the exposure time. In FIG. 10A, a plurality of calculation areas from the exposure time 101a (such as 1/60 seconds) to the exposure time 101d (such as 1/8 seconds) are divided from a calculation start point 101. As illustrated in FIG. 10B, a handheld blur amount is obtained by the number of pixels in a distance (interval) 91d between the maximum and minimum values of the locus waveform 91c at each exposure time (such as the exposure time 101a).

Figure 10C:
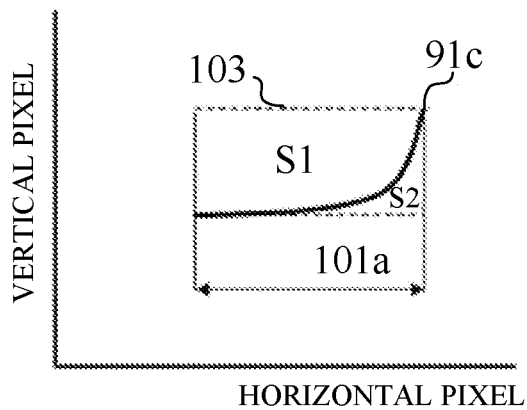

As illustrated in FIG. 10C, another method obtains areas S1 and S2 where the locus waveform 91c divides a rectangle 103 enclosed by the maximum and minimum values of the locus waveform and the calculation area of the exposure time 101a. A smaller one of the areas S1 and S2 is divided by the exposure time 101a to set the handheld blur amount. In FIG. 10B, a section 104 starting from the calculation start point 101 is little blurred, the image deterioration is little, and the handheld blur increases in a short time thereafter. In the case of such a handheld blur, the distance 91d does not correctly represent image deterioration caused by this handheld blur. On the other hand, the method described with reference to FIG. 10C can obtain the handheld blur that reflects the handheld blur curve during the exposure time.

In FIG. 10A, the handheld blur amount can be obtained in each of the divided exposure times 101a to 101d at once. The first embodiment requires the measurement camera 11 to capture images for respective exposure times, but the method according to this embodiment does not require such work. From a calculation start point 95 illustrated by a dashed line (FIG. 10D) that is formed by shifting the calculation start point 101 illustrated by a solid line set in FIG. 10A the right by one pixel, calculation areas 105a to 105d illustrated by dashed lines are set and a handheld blur amount is calculated for each set exposure time. By averaging, for each calculation area (exposure time), large handheld blur amount data obtained by the measurement in FIG. 10D that sequentially shifts pixels in the section where the locus waveform 91c continues, the handheld blur amount is stably obtained. The first embodiment acquires a large number of images using the measurement camera 11 at each exposure time, and obtains the handheld blur amount by processing the obtained images. However, this embodiment does not require such work.

As described above, the first embodiment obtains the handheld blur amount from the image degradation amount of the image captured by the measurement camera 11. However, this method has difficulty in accurately separating image degradation (reference image degradation amount) peculiar to the measurement camera 11 that is not excited and image degradation (handheld blur amount) caused by a handheld blur in a case where the measurement camera 11 is excited. On the other hand, as described with reference to FIGS. 10A to 10D, this embodiment can obtain an accurate handheld blur amount directly from the center-of-gravity locus waveform of the point image and remove disturbance blurs, which are noises having the same phase components by calculating a difference between two locus waveforms.

Figure 11:
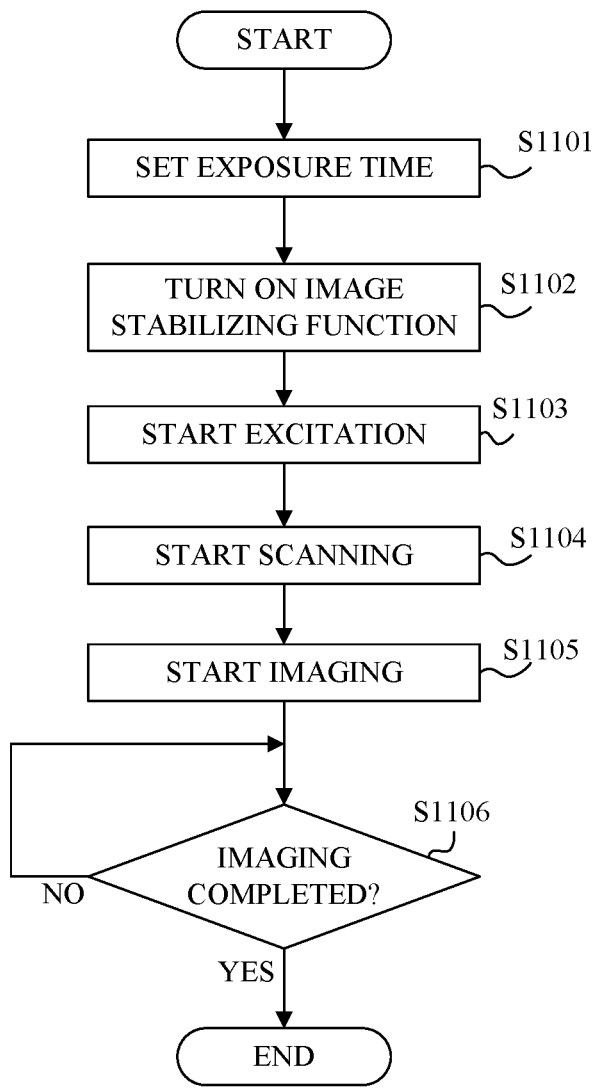
FIG. 11 is a flowchart of a blur measuring method according to the second embodiment.

FIG. 11 is a flowchart of a simple measurement method for imaging the chart 14 with the measurement camera 11. First, in step S1101, the exposure time of the measurement camera 11 is set. The exposure time is set to 4 seconds, which is double the maximum exposure time of 2 seconds, in measuring a handheld blur amount with an exposure time of 1/60 seconds to 2 seconds. For the luminance of the point image 14a in the chart 14, the lighting is adjusted so that the exposure time, F-number (aperture value), and ISO speed are set so that the exposure is proper, or an ND filter is attached to the imaging system of the measurement camera 11.

Next, in step S1102, the image stabilizing function of the measurement camera 11 is turned on. As will be described below, this embodiment does not require handheld blur amount measurement while the image stabilizing function is being turned off. Next, in step S1103, the excitation table 12 is operated to start exciting the measurement camera 11 in the arrow 12R direction. Next, in step S1104, the chart 14 is scanned in an arrow 72Y direction. Next, in step S1105, the measurement camera 11 that is being excited starts capturing the operated point images 14a and 14c. Next, in step S1106, the flow repeats step S1106 and waits until imaging for four seconds, for example, is completed. After imaging is completed, this flow ends. Thereby, a single image as illustrated in FIG. 8 is obtained. The image in FIG. 8 illustrates temporally identical images of the same object, rather than images obtained by continuously capturing a plurality of images or a combined image of them.

Figure 12:
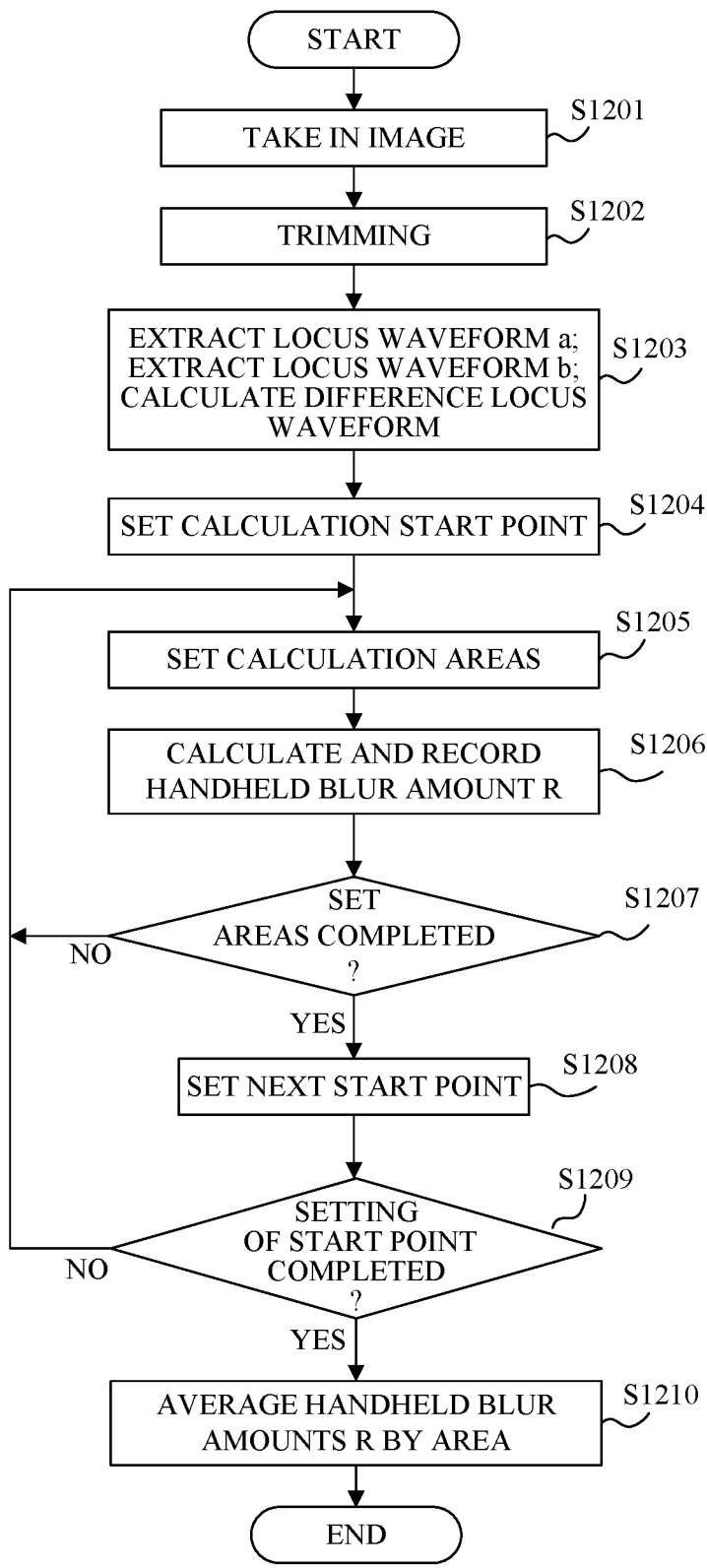
FIG. 12 is a flowchart of a blur evaluating method according to the second embodiment.

FIG. 12 is a flowchart of a handheld blur evaluating method by the locus change measuring unit 16 and the image stabilizing performance evaluating unit 15 for calculating the handheld blur correction residue around the optical axis of the measurement camera 11 from the image obtained by the flow of FIG. 11.

First, in step S1201, the locus change measuring unit 16 obtains the single image 81 in FIG. 8. Next, in step S1202, the locus change measuring unit 16 trims the image 81 with frames 83a and 83b. Next, in step S1203, the locus change measuring unit 16 obtains the position of the center of gravity of each point image in the images of the frames 83a and 83b, and extracts the locus waveforms 91a and 91b of FIG. 9A. The locus change measuring unit 16 also obtains a difference locus waveform 91c from the locus waveforms 91a and 91b.

Next, in step S1204, the image stabilizing performance evaluating unit 15 sets the calculation start point 101 for the handheld blur amount illustrated in FIG. 10A. Next, in step S1205, the image stabilizing performance evaluating unit 15 sets a handheld blur amount calculation area. More specifically, the image stabilizing performance evaluating unit 15 sets the section of the first calculation area (exposure time 101a) for the locus waveform 91c as illustrated in FIG. 10A. Next, in step S1206, the handheld blur amount of the locus waveform 91c in the set calculation area is obtained using the method illustrated in FIG. 10C and a handheld blur amount R is set. Up to step S1205, the vertical axis represents vertical pixels as illustrated in FIG. 10C. After step S1206, for generalization, the pixel size is multiplied by the number of vertical pixels, and the handheld blur amount R is set to μm, for example.

Next, in step S1207, the image stabilizing performance evaluating unit 15 determines whether or not the calculation of the handheld blur amount in the set calculation area has been completed. In a case where the calculation of the handheld blur amount has not yet been completed, the flow returns to step S1205 to set the next section (for example, the second calculation area (exposure time 101b) in FIG. 10A), and the handheld blur amount R in that calculation area is recorded in step S1206. On the other hand, in a case where the image stabilizing performance evaluating unit 15 records the handheld blur amounts R of all the calculation areas (exposure times 101a to 101d) in FIG. 10A, the flow proceeds to step S1208.

In step S1208, the image stabilizing performance evaluating unit 15 sets the next calculation start point. That is, the image stabilizing performance evaluating unit 15 sets the calculation start point 105 in FIG. 10D. Next, in step S1209, the image stabilizing performance evaluating unit 15 determines whether or not the handheld blur amount R of each calculation area at the set calculation start point has been calculated. In a case where there is an uncalculated calculation start point, the flow returns to step S1205, and the image stabilizing performance evaluating unit 15 continues calculation of the handheld blur amount. On the other hand, in a case where the calculation of the handheld blur amount R for each calculation area at all calculation start points has been completed, the flow proceeds to step S1210. In step S1210, the image stabilizing performance evaluating unit 15 obtains an average handheld blur amount R by averaging the recorded handheld blur amounts R at respective calculation start points for each calculation area.

Figure 13:
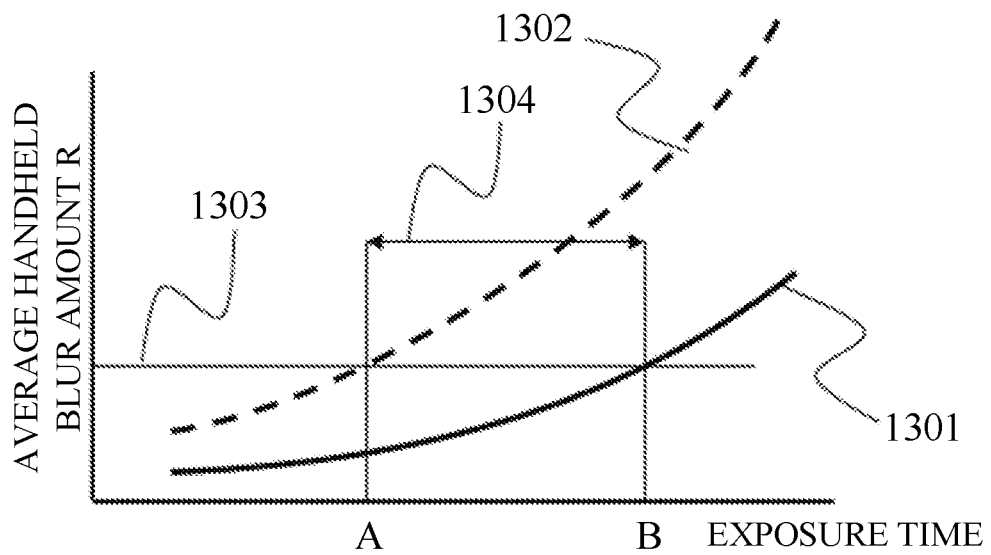
FIG. 13 is a graph of image stabilizing performance evaluation according to the second embodiment.

FIG. 13 is a graph of image stabilizing performance evaluation, illustrating the average handheld blur amount R obtained by the above handheld blur calculation. In FIG. 13, the horizontal axis represents the exposure time, and for example, the calculation areas for the exposure times 101a to 101d in FIG. 10A are associated with the exposure times. On the horizontal axis, the exposure time becomes longer toward the right. The vertical axis represents the average handheld blur amount R. A solid curve 1301 represents the average handheld blur amount R curve obtained in the flow of FIG. 12 and a handheld blur correction residue in a case where the image stabilizing function of the measurement camera 11 is turned on. A broken curve 1302 represents a handheld blur amount obtained in a case where the image stabilizing function is turned off. The curve 1302 is a theoretical curve obtained by plotting theoretically obtained numerical values rather than the results obtained from the measurement camera 11. The reason why the theoretical curve can be used will be explained below.

Figure 14:
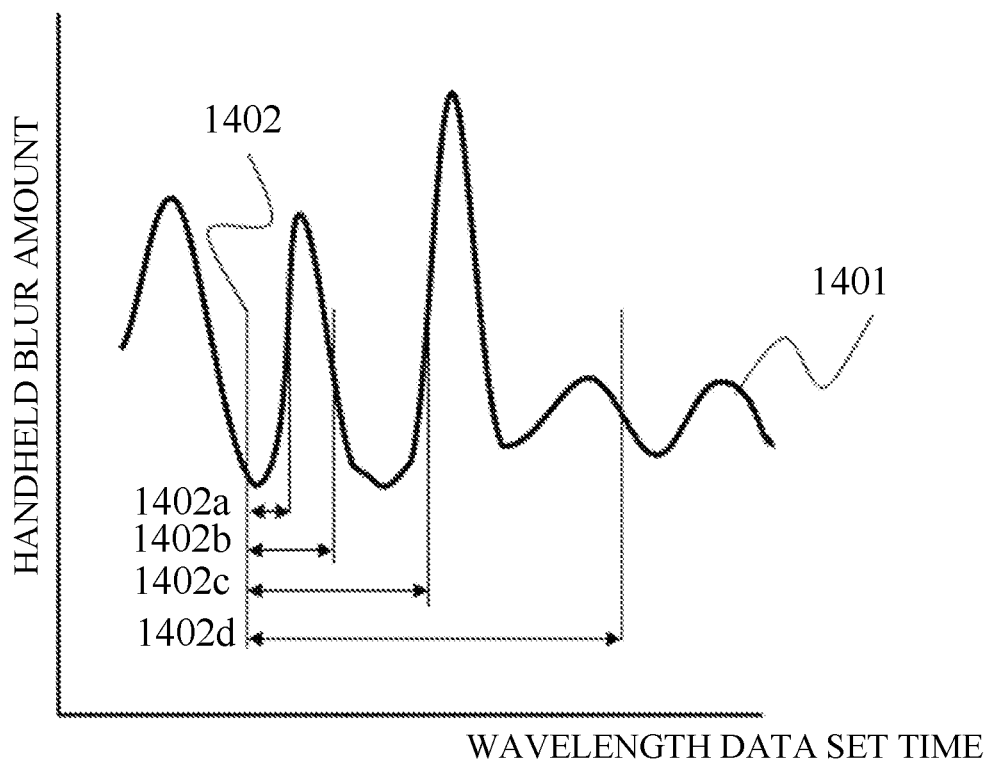
FIG. 14 is a graph of theoretical blur calculation according to the second embodiment.

As mentioned above, a handheld blur amount can be found using the center-of-gravity locus waveform of the point image. Thus, the optical performance and image processing peculiar to each camera model do not affect the handheld blur amount, and only the image stabilizing performance can be evaluated. In a case where the image stabilizing function is turned off, the handheld blur amount based on the excitation waveform data 13 of the excitation table 12 can be obtained for any camera, so it is unnecessary to measure a handheld blur amount for each camera while the image stabilizing function is turned off. The theoretical curve 1302 is obtained as in the following items (1) to (4), similarly to step S1204 and subsequent steps in FIG. 12. FIG. 14 is a graph of theoretical handheld blur calculation. The horizontal axis represents waveform data setting time and the vertical axis represents a handheld blur amount.

(1) As illustrated in FIG. 14, by multiplying a rotation angle θ as the excitation waveform data 13, by the offset L, a handheld blur amount on the image plane in a case where the image stabilizing function is turned off is obtained.

(2) A calculation start point 1402 is set, and the handheld blur amounts R are obtained in respective calculation areas 1402a to 1402d at the calculation start point 1402, similarly to FIG. 10C.

(3) The calculation start point is shifted and the handheld blur amount R is obtained in each of the calculation areas 1402a to 1402d.

(4) An average handheld blur amount R is obtained by averaging the handheld blur amounts R in respective calculation areas at each calculation start point.

The exposure times A and B are read out from the graph, which are located at the intersections between the theoretical curve 1302 of FIG. 13 obtained by the above calculation and the predetermined permissible handheld blur amount threshold 1303, and between the average handheld blur amount R curve 1301 obtained in a case where the image stabilizing function is turned on and the predetermined permissible handheld blur amount threshold 1303. As a difference 1304 between the exposure times A and B becomes longer, the image stabilizing performance becomes higher against rotational handheld blur around the optical axis. Therefore, the image stabilizing performance can be evaluated based on the difference 1304 between the exposure times A and B.

A description will now be given of a function that improves the measurement accuracy. In a case where the positions of the loci of the point images 82*a* and 82*b* illustrated in FIG. 8 and the positions of the frames 83*a* and 83*b* shift, the point images cannot be accurately trimmed. In a case where the arrangement of the loci of the point images 82*a* and 82*b* in the image 81 changes, the shapes of the loci of the point images may change due to optical distortion. Therefore, a function is provided that always projects the loci of the point images 82*a* and 82*b* at the same position in the image 81.

Figure 10D:
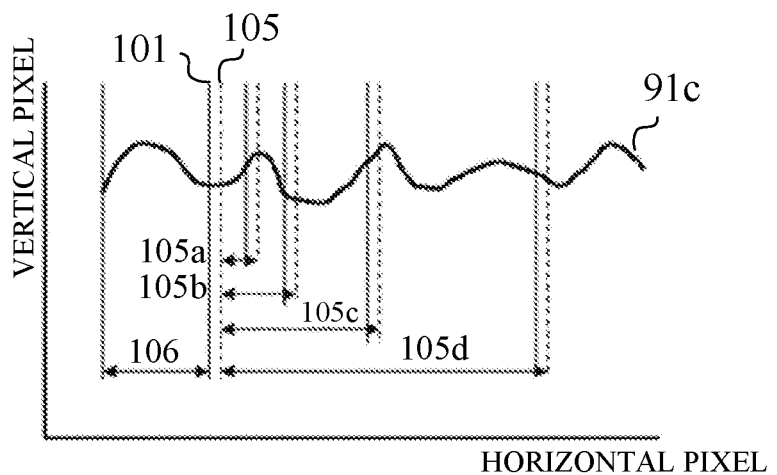
Figure 15A:
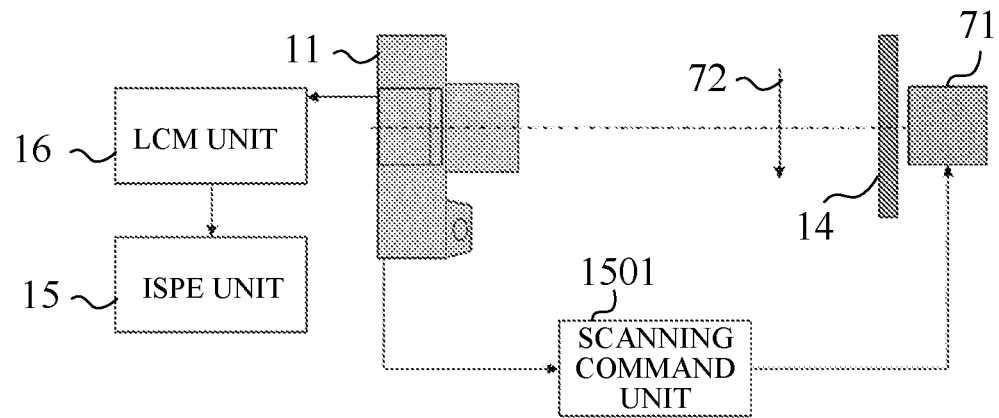
FIGS. 15A and 15B are control diagrams of object scanning according to the second embodiment.
Figure 15B:
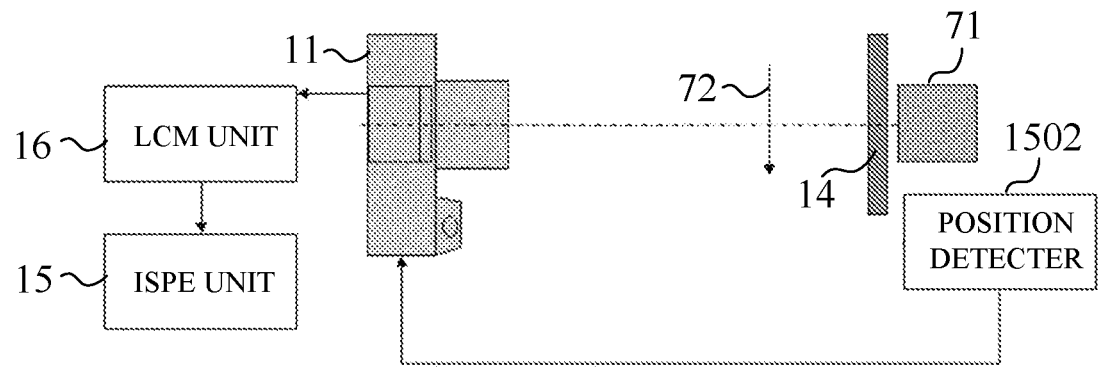

FIGS. 15A and 15B are control diagrams for object scanning. In FIG. 15A, a release signal, which is an imaging start signal of the measurement camera 11, is input to a scanning command unit (measurement synchronizer) 1501. In FIG. 15A, the scanning command unit 1501 receives the release signal and instructs the actuator (scanner) 71 to scan the chart 14. Thus, synchronizing the imaging start and the chart scanning timing can always keep constant a positional relationship between the loci of the point images 82*a* and 82*b* and the image 81. Since constant-speed scanning is not performed for a while from the scanning start of the chart 14, the correct exposure time cannot be set in that section. Accordingly, the calculation start point 101 illustrated in FIG. 10D is set within the constant-speed scanning section, and the handheld blur amount is not calculated with a locus waveform 106 during scanning acceleration.

In FIG. 15B, a position detector (measurement synchronizer) 1502 is provided that detects the scanning position of the chart 14. The position detector 1502 sends to the measurement camera 11 the position at which the chart 14 is scanned at constant speed. The measurement camera 11 captures an image at the timing output from the position detector 1502. Even with such a configuration, the positional relationship between the image 81 and the loci of the point images 82*a* and 82*b* is always kept constant. Since the chart is not captured during scanning acceleration, the calculation start point 101 can be set at the start point of the locus waveform 91*c*, and the calculated handheld blur amount can be increased.

Figure 16:
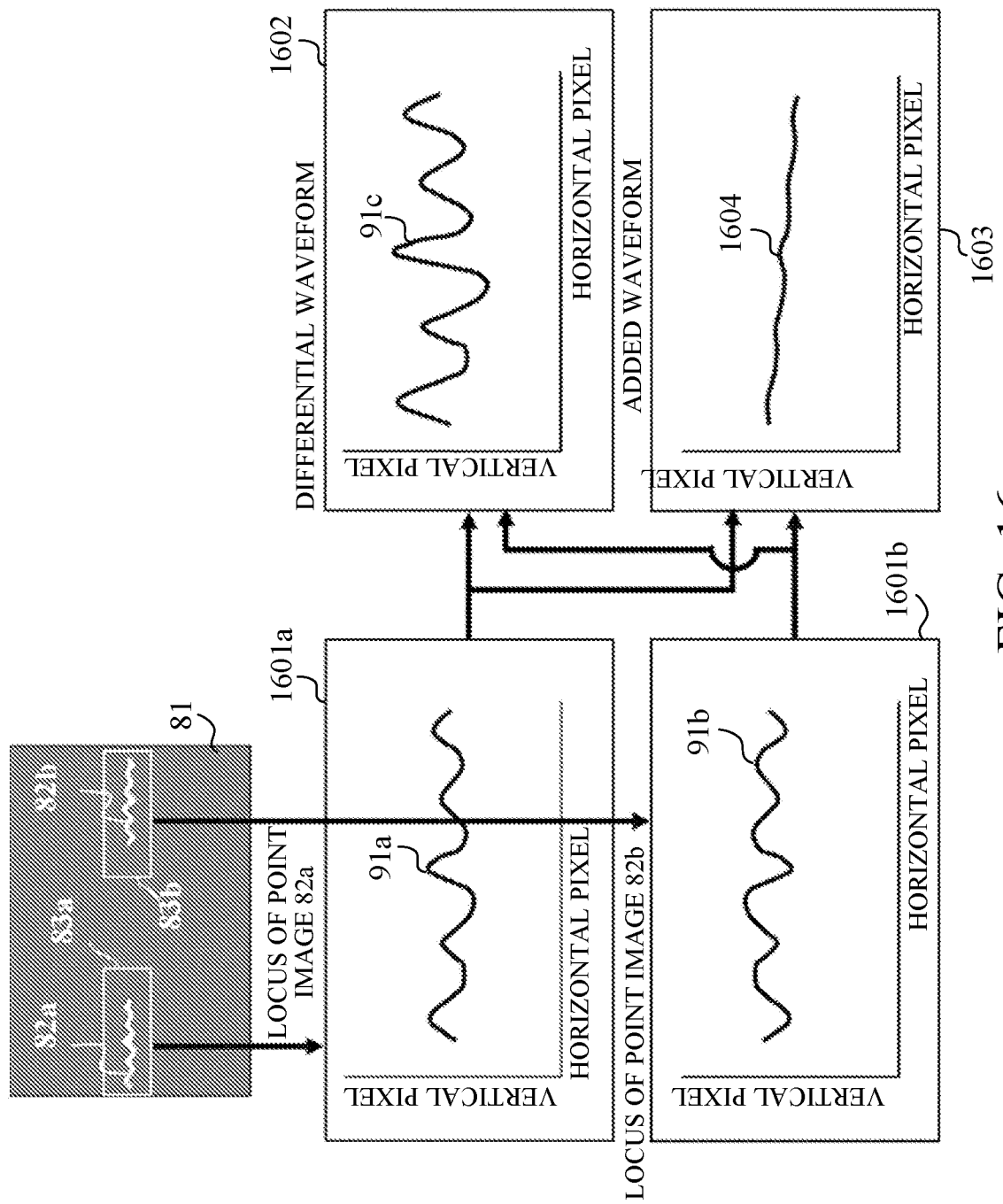
FIG. 16 is a block diagram of a locus change measuring unit in the second embodiment.

As described with reference to FIG. 9, the locus change measuring unit 16 extracts the locus of the center of gravity of each of the pair of point images from the image captured by the measurement camera 11 and creates a differential locus waveform. FIG. 16 is a block diagram of the locus change measuring unit 16. Center-of-gravity locus extracting units 1601*a* and 1601*b* extract loci of the centers of gravity of the point images 82*a* and 82*b* inside the frames 83*a* and 83*b* in the image 81 captured by the measurement camera 11, respectively. The extracted center-of-gravity loci 91*a* and 91*b* are subtracted by a subtractor 1602 to obtain the center-of-gravity locus 91*c*. The above subtraction cancels the angular handheld blur and shift handheld blur, which are noises having the same components, leaving only the rotational handheld blur around the optical axis.

Figure 17A:
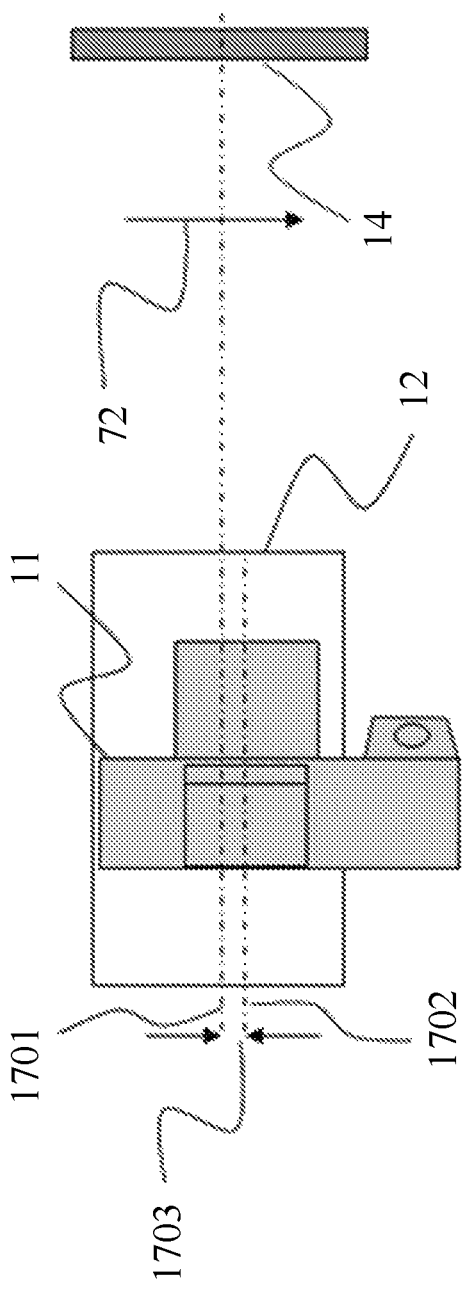
FIGS. 17A and 17B explain an attachment error of the measurement camera in the second embodiment.
Figure 17B:
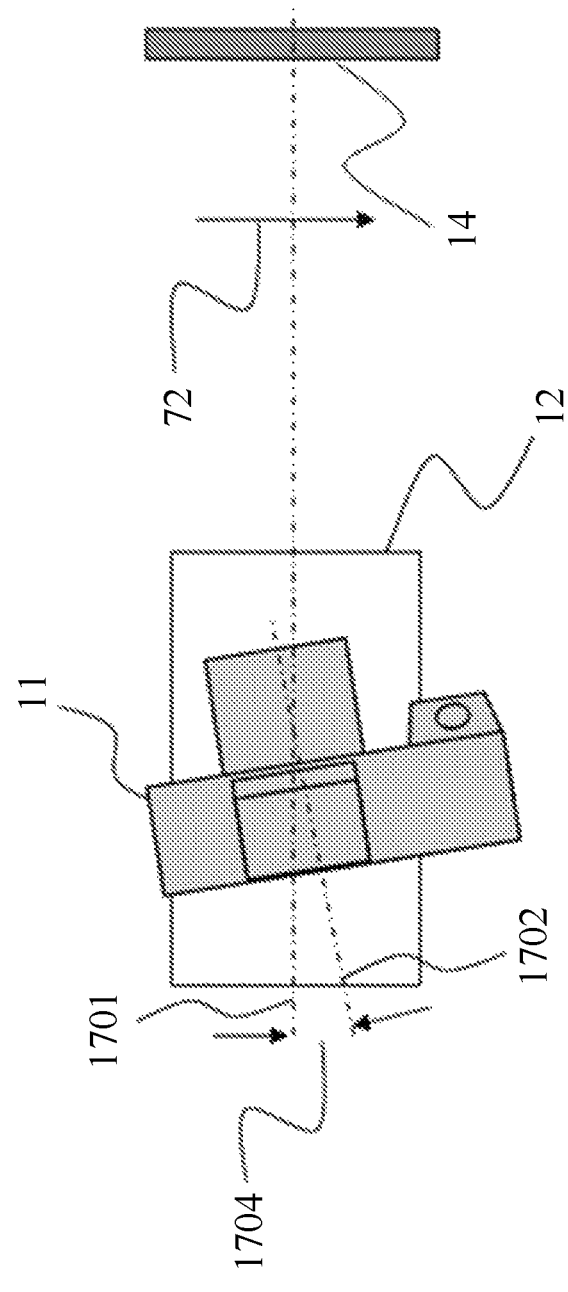

FIGS. 17A and 17B explain the attachment error of the measurement camera 11. FIG. 17A illustrates the measurement camera 11 is attached while an optical axis 1702 of the measurement camera 11 is offset 1703 relative to a rotational excitation axis 1701 of the excitation table 12. In a case where attachment with offset thus occurs, a shift handheld blur occurs due to rotational excitation at the center of the image (screen) of the measurement camera 11. As illustrated in FIG. 17B, in a case where the measurement camera 11 is attached while the optical axis 1702 of the measurement camera 11 is tilted 1704 relative to the rotational excitation axis 1701 of the excitation table 12, an angular handheld blur occurs in the measurement camera 11 due to the rotational excitation. Since the locus changes of the point images due to the shift handheld blur and angular handheld blur can be canceled by the subtractor 1602, the image stabilizing performance for rotation around the optical axis can be stably evaluated regardless of whether the measurement camera 11 is attached.

The scanning direction of the chart 14 may be along the horizontal direction of the measurement camera 11. Accordingly, an adder 1603 adds the center-of-gravity loci 91*a* and 91*b* to obtain the slope of the waveform 1604 in which the handheld blur locus caused by the rotation is canceled. The scanning direction of the chart 14 is adjusted by an unillustrated adjusting unit so that the tilt disappears (becomes horizontal). In a case where the attachment error of the measurement camera 11 to the excitation table 12 illustrated in FIGS. 17A and 17B is large, even the subtractor 1602 cannot sufficiently cancel the locus change due to the shift handheld blur and the angular handheld blur. Even in such a case, the attachment error can be adjusted by viewing the fluctuation of the locus waveform 1604 of the adder 1603. That is, the locus change measuring unit 16 uses the adder 1603 to determine whether the measurement environment is proper.

Figure 18:
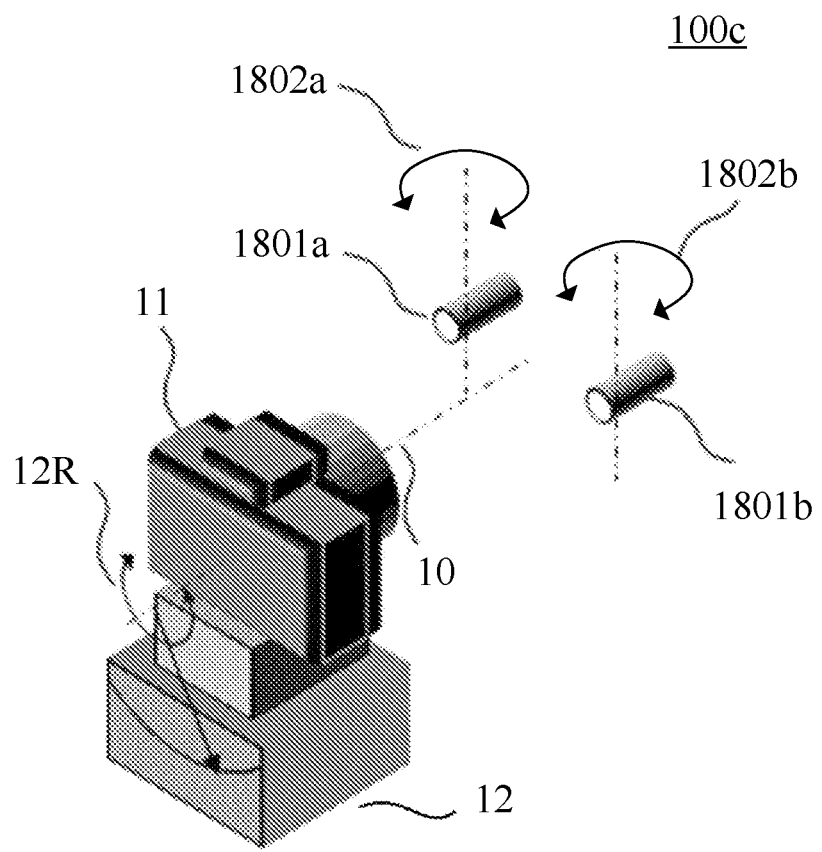
FIG. 18 is a perspective view of another evaluating apparatus according to the second embodiment.

In FIG. 7, the point images 14*a* and 14*c* of the chart 14 as the feature points are shifted and scanned in the arrow 72 direction, but the feature points are not limited to the point images, and the point light source as the feature point may be shifted in the arrow 72 direction. Collimated light sources 1801*a* and 1801*b* may be tilted and scanned in directions of arrows 1802*a* and 1802*b* as in an evaluating apparatus 100*c* illustrated in FIG. 18.

Thus, this embodiment scans a pair of point images and obtains the center-of-gravity loci. This embodiment can evaluate handheld blur with high accuracy without being affected by the optical performance and image processing state peculiar to the measurement camera 11, by obtaining the rotation handheld blur correction residue around the optical axis from a difference between center-of-gravity loci.

As described above, the evaluating apparatus 100*b* evaluates the image stabilizing performance around the optical axis of the imaging unit (measurement camera 11). The evaluating apparatus includes the chart 14 that has the first feature point (point image 14*a*) and the second feature point (point image 14*c*) facing the imaging unit. At least one of the feature points is not located at the center of the imaging composition (or at least one of them is located at the peripheral position). The evaluating apparatus further includes the actuator (scanner) 71 configured to scan the chart 14 and the excitation unit (excitation table 12) configured to excite the imaging unit. The evaluating apparatus further includes the image stabilizing performance evaluating unit 15 configured to evaluate locus images (in a single image) of the first feature point and the second feature point captured by the imaging unit that is being excited by the excitation unit.

The evaluating apparatus includes the locus change measuring unit 16 configured to acquire a first center-of-gravity locus of the first feature point and a second center-of-gravity locus of the second feature point from the locus images of the first feature point and the second feature point captured by the imaging unit. The image stabilizing performance evaluating unit 15 evaluates a handheld blur around the optical axis that the imaging unit could not completely correct, from the first center-of-gravity locus and the second center-of-gravity locus (a plurality of center-of-gravity locus waveforms) acquired by the locus change measuring unit 16. The locus change measuring unit 16 obtains a differential locus (differential locus waveform) between the first centerof-gravity locus and the second center-of-gravity locus, and the image stabilizing performance evaluating unit 15 evaluates the handheld blur around the optical axis from the differential locus and thereby evaluates the image stabilizing performance against handheld blur around the optical axis. The locus change measuring unit 16 determines whether or not the measurement environment including the imaging unit, the excitation unit, and the object is proper, based on the added locus (added locus waveform) of the first center-of-gravity locus and the second center-of-gravity locus.

Third Embodiment

A description will now be given of a third embodiment according to the present disclosure. Focusing on the fact that a handheld blur (shift handheld blur) in a case where a camera is horizontally shifted causes image degradation, this embodiment and a fourth embodiment described below execute an image stabilizing performance evaluating method for a handheld blur including a shift handheld blur and thereby evaluate the image stabilization performance with high accuracy.

Figure 19A:
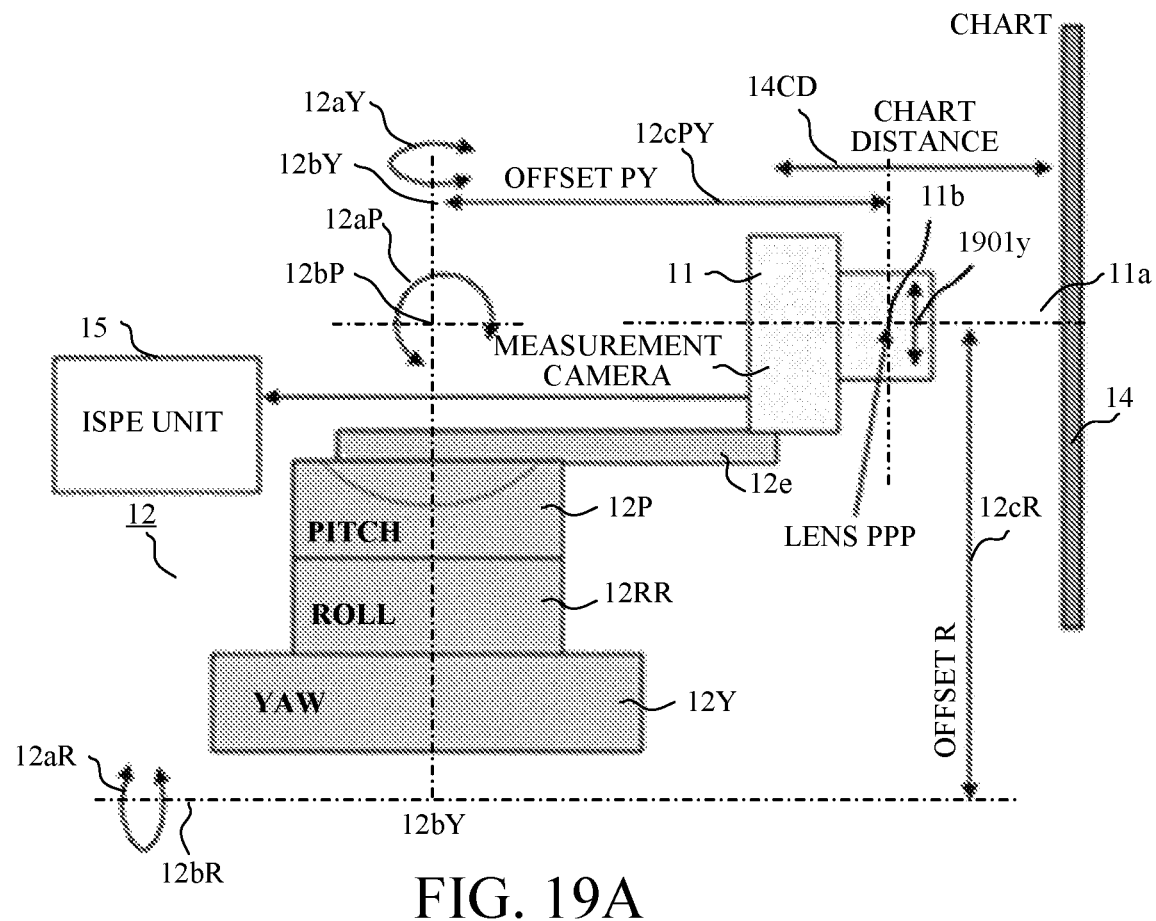
FIGS. 19A to 19D are schematic diagrams of an evaluating apparatus according to a third embodiment.
Figure 19B:
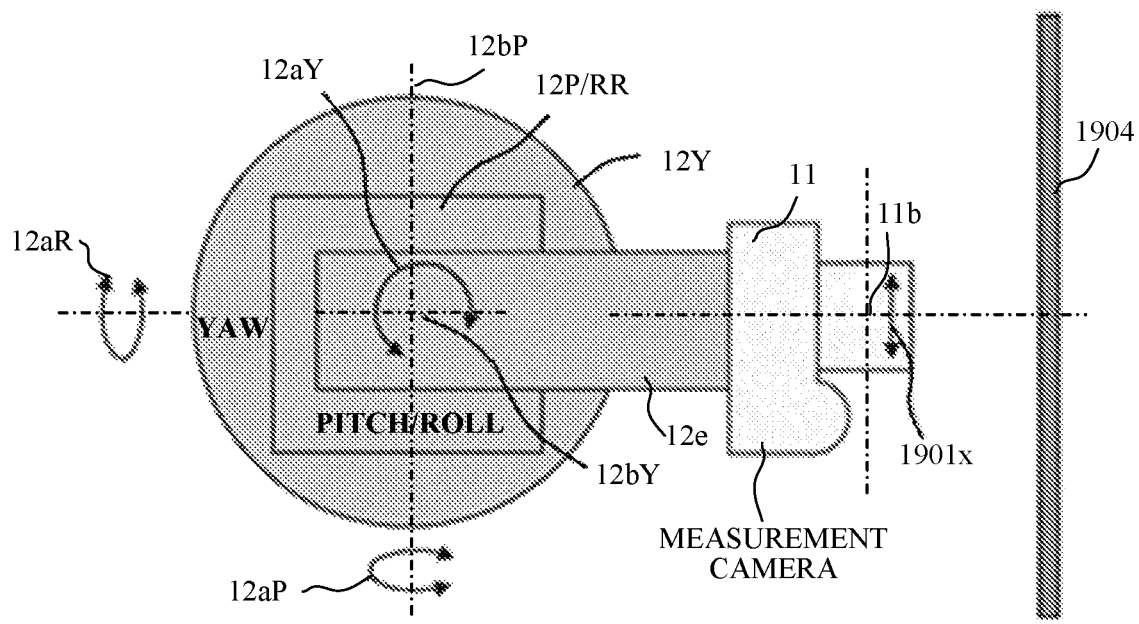
Figure 19C:
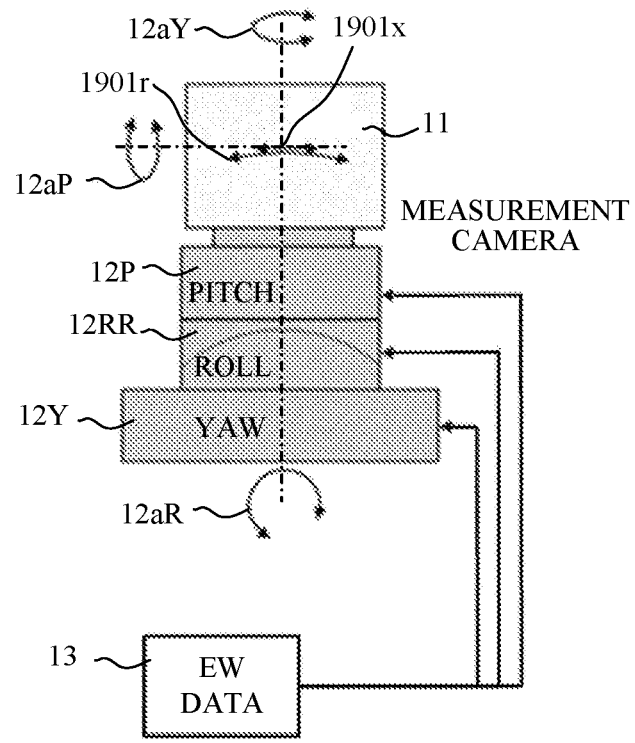
Figure 19D:
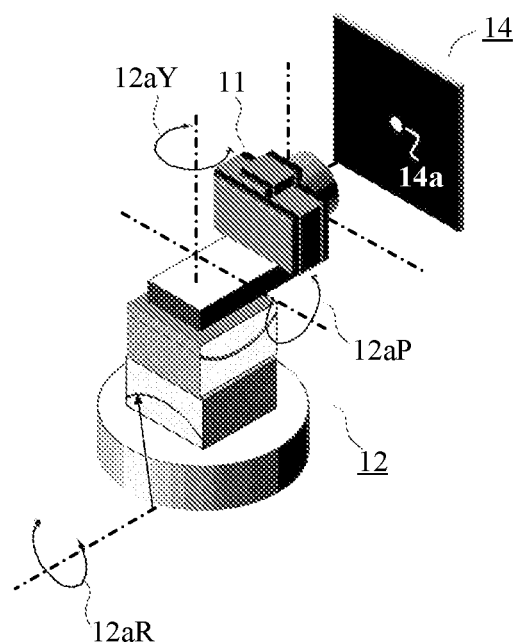

FIGS. 19A to 19D are schematic diagrams of an evaluating apparatus 100d configured to execute the camera shake amount measuring method (handheld blur evaluating method) according to this embodiment. FIG. 19A is a side view, FIG. 19B is a top view, FIG. 19C is a rear view, and FIG. 19D is a perspective view. The excitation table 12 includes a yaw excitation table 12Y that rotates in an arrow 12aY direction about an axis of an excitation center 12bY, a pitch excitation table 12P that rotates in an arrow 12aP direction about an axis 12bP, and a roll excitation table 12RR that rotates in an arrow 12aR direction about an axis 12bR. Each of the excitation tables 12P, 12Y, and 12R is driven by the excitation waveform data 13. The excitation waveform data 13 is an average model handheld blur waveform in a case where the photographer holds the camera and captures an image in each of the excitation tables 12P, 12Y, and 12R. The measurement camera 11 fixed on the excitation table 12e faces the chart 14, which is an object, at a distance 14b. Image data of the chart captured by the measurement camera 11 is input to the image stabilizing performance evaluating unit 15. The chart 14 is illustrated as a point image 14a in FIG. 19D, but is not limited to this example.

As illustrated in FIGS. 19A to 19D, the measurement camera 11 is provided at a position away from each excitation center 12bP, 12bY, and 12bR of the excitation table 12. A distance between the principal point position (lens principal point position 11b) of the imaging optical system of the measurement camera 11 and each of the excitation centers (first excitation centers) 12bP and 12bY is an offset PY (12cPY). A distance between the lens principal point position 11b and the excitation center (second excitation center) 12bR is an offset R (12cR). Thus, offsetting the lens principal point position 11b from the excitation center of each axis can reproduce the same state as in a case where the photographer holds the camera.

A description will now be given of the influence of a handheld blur amount on the imaging plane due to the offset. A handheld blur amount on the imaging plane of the measurement camera 11 excited by the excitation table 12 is obtained by the following equation (1):

$$\delta = (1+\beta) \times f \times \tan\theta + \beta \times Y \qquad (1)$$

where $\delta$ is a handheld blur amount on the image plane, $\beta$ is an image magnification (ratio of object size on imaging plane and actual object size), f is a focal length (focal length of the imaging optical system), $\theta$ is an angular handheld blur (rotation angle of excitation table), and Y is a shift handheld blur (moving amount of lens principal point position).

As understood from equation (1), the handheld blur amount on the image plane is determined by two types of handheld blurs, i.e., the angular handheld blur and shift handheld blur, caused by the photographer. The image-plane handheld blur amount due to an angular handheld blur is determined by a relationship between the rotation angle $\theta$ (12aY, 12aP) excited by the excitation table 12 and the focal length f, and the shift handheld blur is determined by a relationship between the moving amount Y (1901x, 1901r, 1901r) of the lens principal point position 11b and the image magnification $\beta$. Here, the moving amount Y is obtained by the following equations (2) and (3):

$$Yy = L1 \times \theta1 \qquad (2)$$

$$Yx = L1 \times \theta2 + L2 \times \theta3 \qquad (3)$$

where Yy is a moving amount in an arrow 1901y direction, Yx is a sum of moving amounts in arrows 1901x and 1901r directions, L1 is the offset PY (where reference numeral 12cPY denotes an offset amount in the first direction), L2 is the offset R (where reference numeral 12cR denotes an offset amount in the second direction), $\theta1$ is an angular handheld blur around the arrow 12aP, $\theta2$ is an angular handheld blur around the arrow 12aY, and $\theta3$ is an angular handheld blur around the arrow 12aR.

As is clear from equations (1) to (3), offsetting the measurement camera 11 from the excitation center of the excitation table 12 adds a handheld blur amount due to the shift handheld blur to the imaging plane, and can correctly reproduce the handheld blur amount on the imaging plane while the photographer holds the camera. Thus, the state in which the photographer holds the camera can be correctly reproduced under the following environment.

Using the excitation table rotatable around three axes.
Offsetting each excitation center and the imaging lens principal point position.

Here, the offset amount L1, which is the offset PY (12cPY) that is the set offset amount, is obtained by the following equation (4):

$$L1 = a + (1+\beta)*f \qquad (4)$$

In equation (4), "a" is, for example, a distance between the head of the photographer and the camera, which is 5 to 20 cm. The offset amount L2, which is the offset R (12cR), has a frequent value of 10 to 40 cm, the chart distance 14CD is set to a value about ten times as long as the lens focal length, and the image magnification is set to 0.1. The chart distance may be adjusted according to a type of lens such as a telephoto lens, a wide-angle lens, and a macro lens.

A description will now be given of image stabilizing performance evaluation. Currently, many cameras and lenses have image stabilizing functions (image stabilizing systems), and evaluation of the image stabilizing performance, which is the accuracy of the image stabilizing function, is disclosed in PCT International Publication No. WO 2013/076964 and the like. Here, in order to evaluate the image stabilizing performance using the measurement environment illustrated in FIGS. 19A to 19D, it is necessary to first know the lens principal point position 11b of the measurement camera 11. The lens principal point position 11b can be obtained by the following method:

(1) Determining an estimated principal point position, marking it on a lens barrel or the like, and fixing the measurement camera 11 to the excitation table 12e of the excitation table 12 at a position offset (L0) from the excitation center to the estimated principal point position.

(2) While the image stabilizing function is being turned off, only the excitation table 12P is excited with a constant amplitude and a constant period. At this time, the exposure time of the measurement camera 11 is set longer than the excitation period. In a case where the excitation tables 12Y and 12R are not excited, the number of excitation parameters is reduced and the calculation can be simplified.

(3) Imaging is performed, and the image stabilizing performance evaluating unit 15 obtains the handheld blur amount δ on the imaging plane using processing described below. Calculation of the handheld blur amount δ will be described below with reference to FIGS. 20A and 20B.

(4) Since the angle θ of the excitation table, the chart distance 14CD, and the focal length f of the lens are known, the shift handheld blur amount Y is obtained by back calculation of equation (1).

(5) Using equation (2), the distance L1 is obtained from the excitation center to the lens principal point position.

Figure 20A:
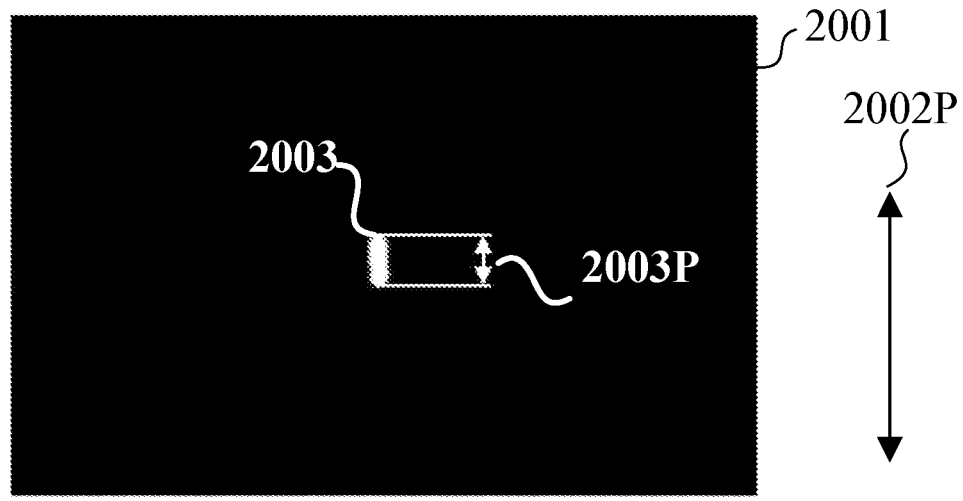
FIGS. 20A and 20B illustrate total image degradation locus images in the third embodiment.
Figure 20B:
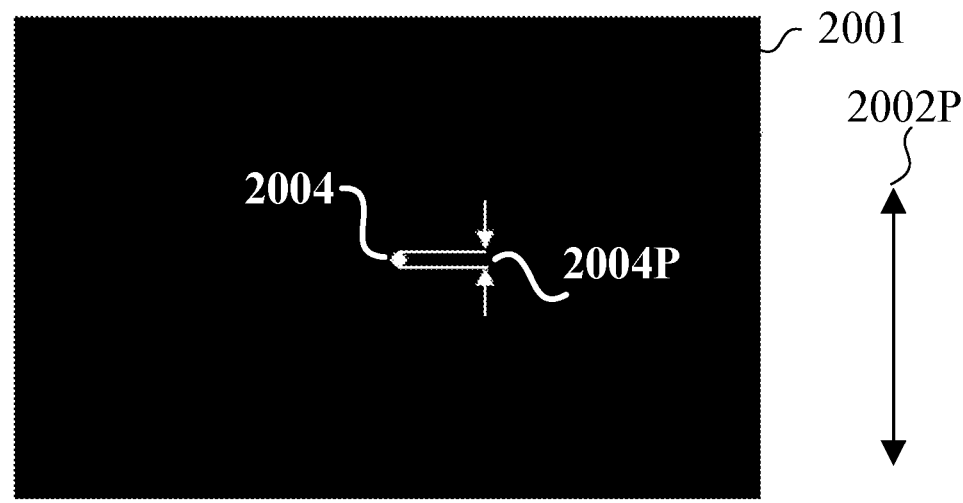

FIG. 20A illustrates an image of the point image 14a on the chart 14 captured by the measurement camera 11, and the image stabilizing performance evaluating unit 15 detects a locus 2003 due to a handheld blur of the captured image data. The image stabilizing performance evaluating unit 15 obtains a locus length 2003P in an image plane deterioration direction 2002P caused by the excitation by the excitation table 12P, and sets it as an total image degradation amount. FIG. 20B illustrates an image of the point image 14a on the chart 14 captured by the measurement camera 11 that is not being excited, and the image stabilizing performance evaluating unit 15 detects a locus 2004 due to a handheld blur of the captured image data. The image stabilizing performance evaluating unit 15 obtains a locus length 2004P and sets it as a reference image degradation amount. Thus, the image stabilizing performance evaluating unit 15 obtains an total image degradation amount of the measurement camera 11 that is being excited and a reference image degradation amount of where the measurement camera 11 that is not being excited, and obtains a handheld blur amount of the camera that is being excited, from a difference between them.

Figure 21:
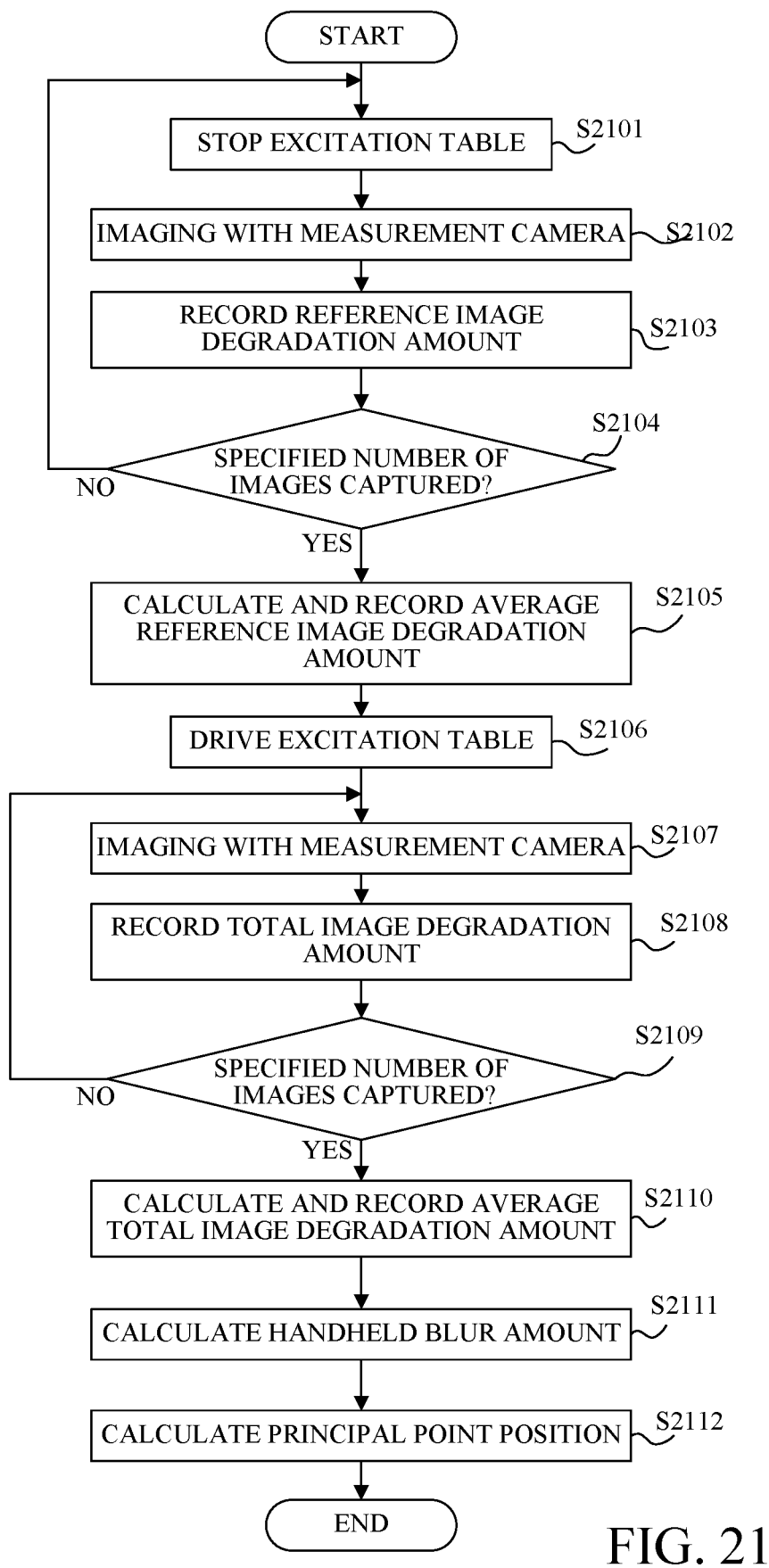
FIG. 21 is a flowchart of a method for calculating a lens principal point position in the third embodiment.

FIG. 21 is a flowchart illustrating a method of calculating the lens principal point position of the measurement camera 11 by the image stabilizing performance evaluating unit 15. First, in step S2101, the excitation table 12 is stopped. Next, in step S2102, the point image 14a is captured by the measurement camera 11 while the excitation table 12 is being stopped and no handheld blurs occur. Next, in step S2103, the image stabilizing performance evaluating unit 15 obtains and records the image degradation amount of the point image 14a. This is the step of obtaining a reference image degradation amount peculiar to the measurement camera 11 by obtaining the image degradation amount (of the locus length 2004P) in FIG. 20B.

Next, in step S2104, the flow returns to step S2101 until all images to be measured are completely captured. The number of images to be measured is set to 20, for example, in view of measurement scattering. In step S2105, the image stabilizing performance evaluating unit 15 averages the reference image degradation amounts obtained by respective imaging and sets an average reference image degradation amount. Next, in step S2106, the excitation table 12P is excited. As described above, the reason why the excitation tables 12Y and 12R are not excited is to simplify the calculation of the lens principal point position. Next, in step S2107, the point image 14a is captured by the measurement camera 11 in the same manner similarly to step S2102. Next, in step S2108, the image stabilizing performance evaluating unit 15 obtains and records the total image degradation amount of the point image 14a in the same manner as in step S2103. This is the step of obtaining the total image degradation amount (of the locus length 2003P) in FIG. 20A.

Next, in step S2109, similarly to step S2104, the flow returns to step S2107 until all images to be measured are completely captured. The number of images to be measured is set to 20, for example, in consideration of measurement scattering. In step S2110, the image stabilizing performance evaluating unit 15 averages the total image degradation amounts obtained by respective imaging and sets an average total image degradation amount. Next, in step S2111, the image stabilizing performance evaluating unit 15 subtracts the average reference image degradation amount obtained in step S2105 from the average total image degradation amount obtained in step S2111 and obtains a handheld blur amount. Next, in step S2112, the image stabilizing performance evaluating unit 15 determines the distance L1 from the excitation center to the lens principal point position based on the handheld blur amount δ obtained in step S2111 and equations (1) and (2). The lens principal point position is a point at the distance L1 from the excitation center on the lens barrel of the measurement camera 11.

After the lens principal point position is determined, the offset amount from the excitation center to the lens principal point position is set to a value having a high frequency often seen during imaging, and the measurement camera 11 is fixed to the table 12e. More specifically, the offset PY (12cPY) from the lens principal point position 11b to the excitation center obtained in FIG. 21 is set to the value of equation (4). For example, where the lens has a focal length of 100 mm and the image magnification is 0.1, L1 becomes 120 mm. The offset R between the optical axis 11a of the imaging lens and the rotation center of the roll excitation table is L2=20 cm, for example.

Figure 22:
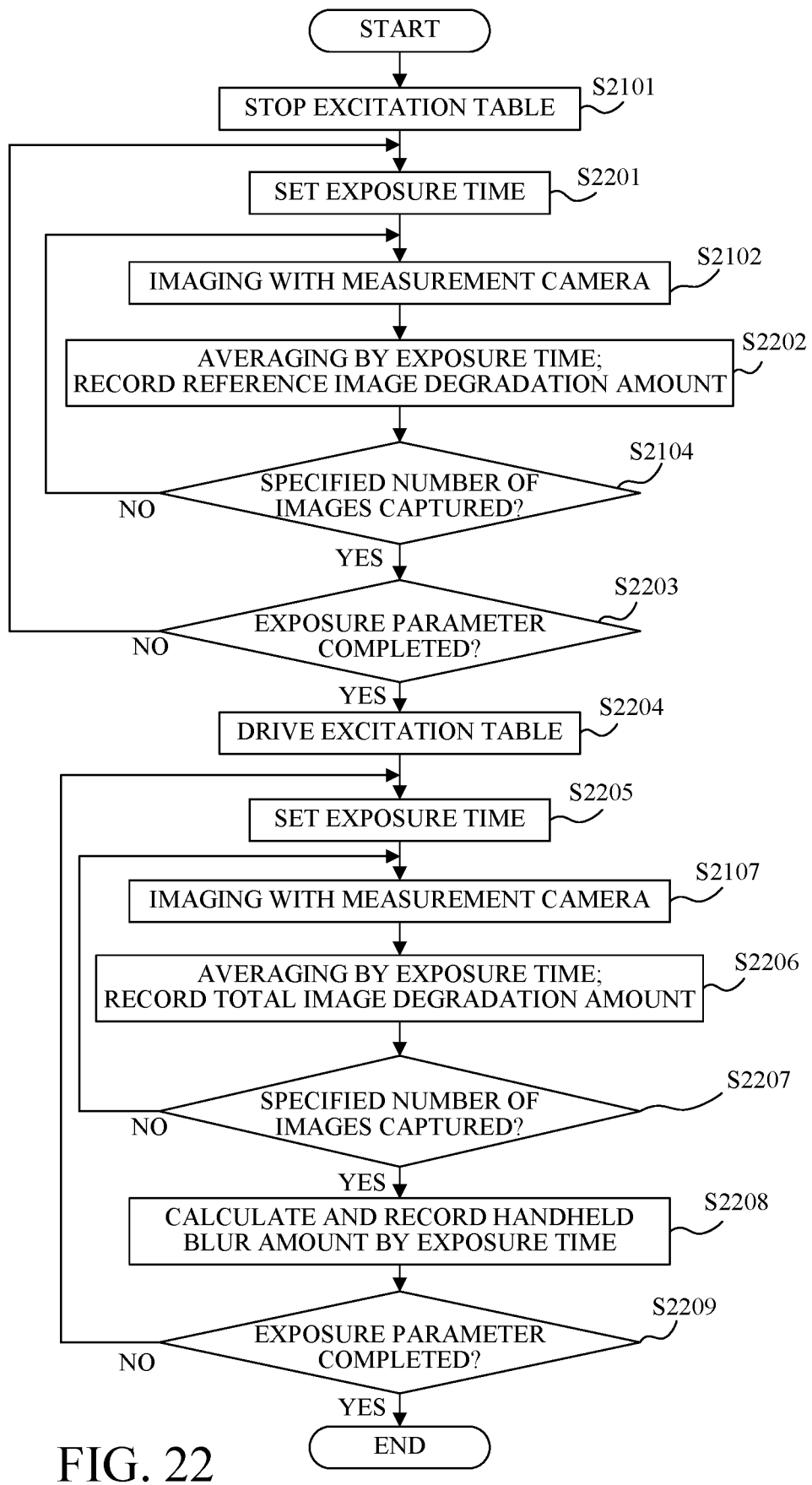
FIG. 22 is a flowchart of a blur evaluating method in the third embodiment.

FIG. 22 is a flowchart illustrating an image stabilizing performance evaluating method (handheld blur evaluating method) of the measurement camera 11 by the image stabilizing performance evaluating unit 15. Those steps in FIG. 22, which are corresponding steps in FIG. 3, will be designated by the same step numerals and a description thereof will be omitted.

In step S2201, the exposure time of the measurement camera 11 is set. For example, in a case where the focal length of the imaging lens in the measurement camera 11 is 100 mm and the image sensor has a size of a full-size format (36 mm in width and 24 mm in height), the time is initially set to 1/100 seconds.

Figure 23A:
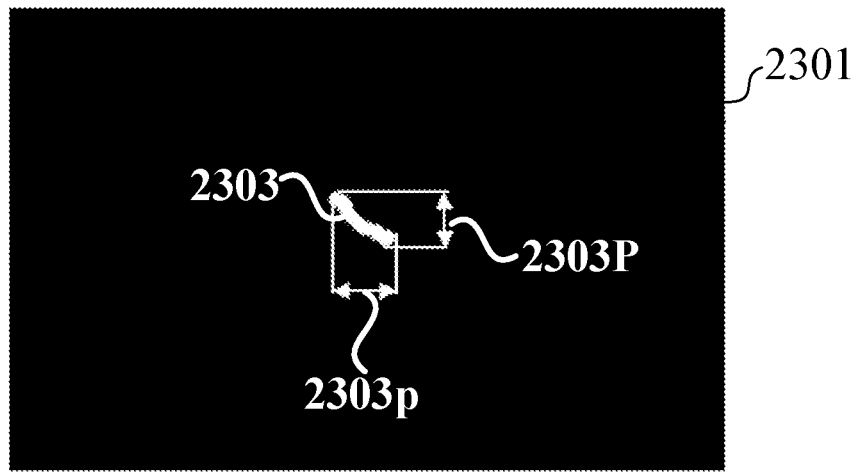
FIGS. 23A and 23B illustrate other total image degradation locus images in the third embodiment.
Figure 23B:
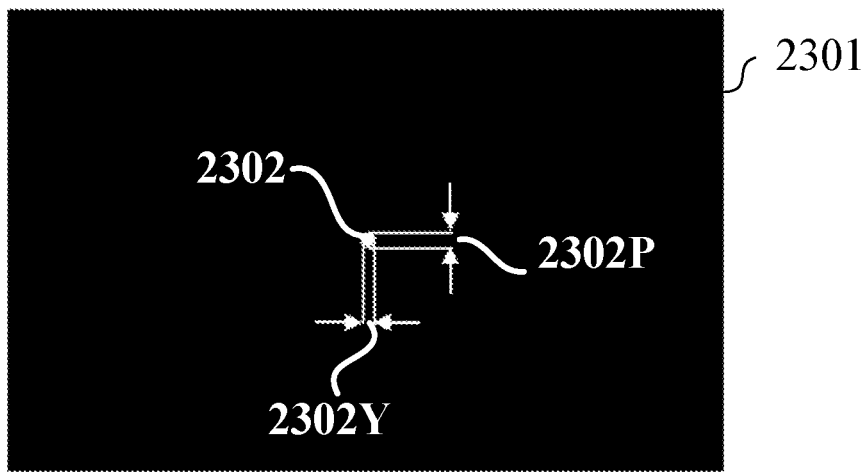

In step S2202, the image stabilizing performance evaluating unit 15 obtains a image degradation amount in the set exposure time of the measurement camera 11. This is the step of obtaining image degradation amounts 2302P and 2302Y in FIG. 23B in a state having no handheld blur, and a reference image degradation amount, which is image degradation peculiar to the measurement camera 11, by averaging them for each exposure time set in step S2201.

In step S2203, the flow returns to step S2201 until the exposure time to be measured is completed. The exposure time is set by increasing the exposure time whenever the flowchart loops, and exiting step S2203 at a predetermined exposure time (½ second or the like).

In step S2204, the excitation tables 12P, 12Y, and 12R are driven based on excitation waveform data 12d. Next, in step S2205, the exposure time is set as in step S401.

In step S2206, the image stabilizing performance evaluating unit 15 obtains an total image degradation amount in the set exposure time of the measurement camera 11. This is the step for obtaining total image degradation amounts 2303P and 2303Y in FIG. 23A in a blurred state, by averaging them for each exposure time set in step S2205. Next, in step S2207, the flow returns to step S2106 until, for example, 100 images are captured in the same exposure time, and the flow proceeds to step S2208 after 100 images are captured. Since the excitation waveform data uses an irregular waveform, the total image degradation amount obtained from the measurement camera 11 is different for each measurement. Therefore, the total image degradation amount is stabilized by imaging a plurality of times in the loop of steps S2107 to S2207 and averaging them in step S2206 to obtain an average total image degradation amount.

In step S2208, the image stabilizing performance evaluating unit 15 obtains a difference between the average total image degradation amount recorded in step S2207 and the reference image degradation amount recorded in step S2202 for each exposure time, and records it as a handheld blur amount. Next, in step S2209, similarly to step S2203, the flow returns to step S2205 until the exposure time to be measured ends. The exposure time is set by increasing the exposure time whenever the flowchart loops. In a case where the exposure time reaches a predetermined exposure time (½ second or the like), step S2209 is exited, and the flow ends.

Figures 24A, 24B:
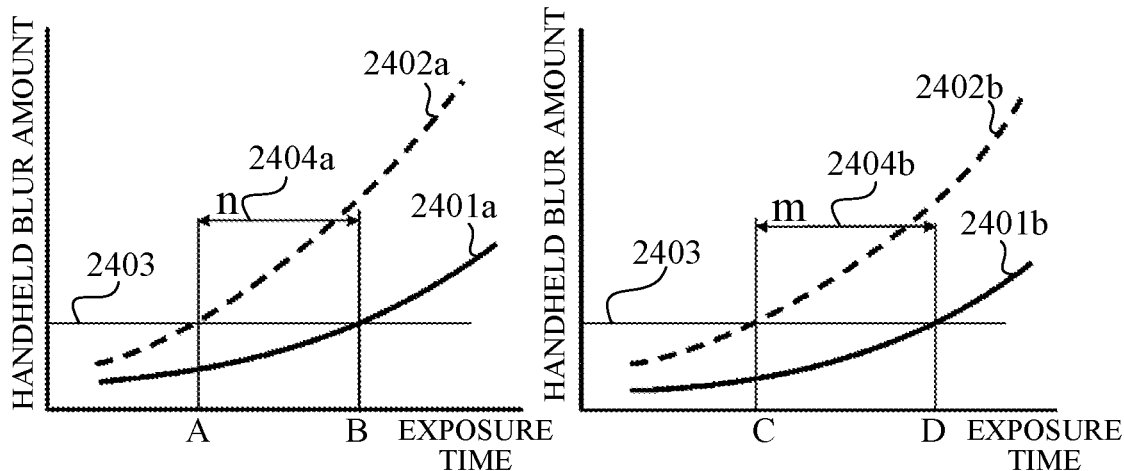
FIGS. 24A and 24B illustrate graphs of image stabilizing performance evaluation in the third embodiment.

FIG. 24A is a graph of the shake amount obtained in step S2208. FIG. 24A is an image stabilizing performance evaluation graph in a state where image deterioration caused by the shift handheld blur occurs. A horizontal axis represents exposure time, and the exposure time increases toward the right. A vertical axis represents a handheld blur amount. A solid curve 2401a represents a handheld blur curve obtained in step S2208 in a case where the image stabilizing function of the measurement camera 11 is turned on, and a dashed curve 2402 is the theoretical handheld blur curve in a case where the image stabilizing function of the measurement camera 11 is turned off. PCT International Publication No. WO 2013/076964 describes a theoretical curve in a state at which there is no shift handheld blur, and this curve is also used in this embodiment. This curve is obtained by multiplying a handheld blur amount by a magnification G because the shift handheld blur is applied. The magnification G is obtained by the following equation (5):

$$G=((1+\beta)*f+L1*\beta)/f \quad (5)$$

Exposure times A and B are read out of the graph, which are located at intersections between a predetermined permissible handheld blur amount threshold 2403 and a handheld blur curve 2402a in a case where the image stabilizing function is turned off and between the predetermined permissible handheld blur amount threshold 2403 and a handheld blur curve 2401a in a case where the image stabilizing function is turned on. As the interval n (2404a) between the exposure times A and B becomes longer, the image stabilizing performance of the camera becomes higher against an angle handheld blur and a shift handheld blur. The evaluation of image stabilizing performance in the state where shift handheld blur occurs has been described above.

Figure 25:
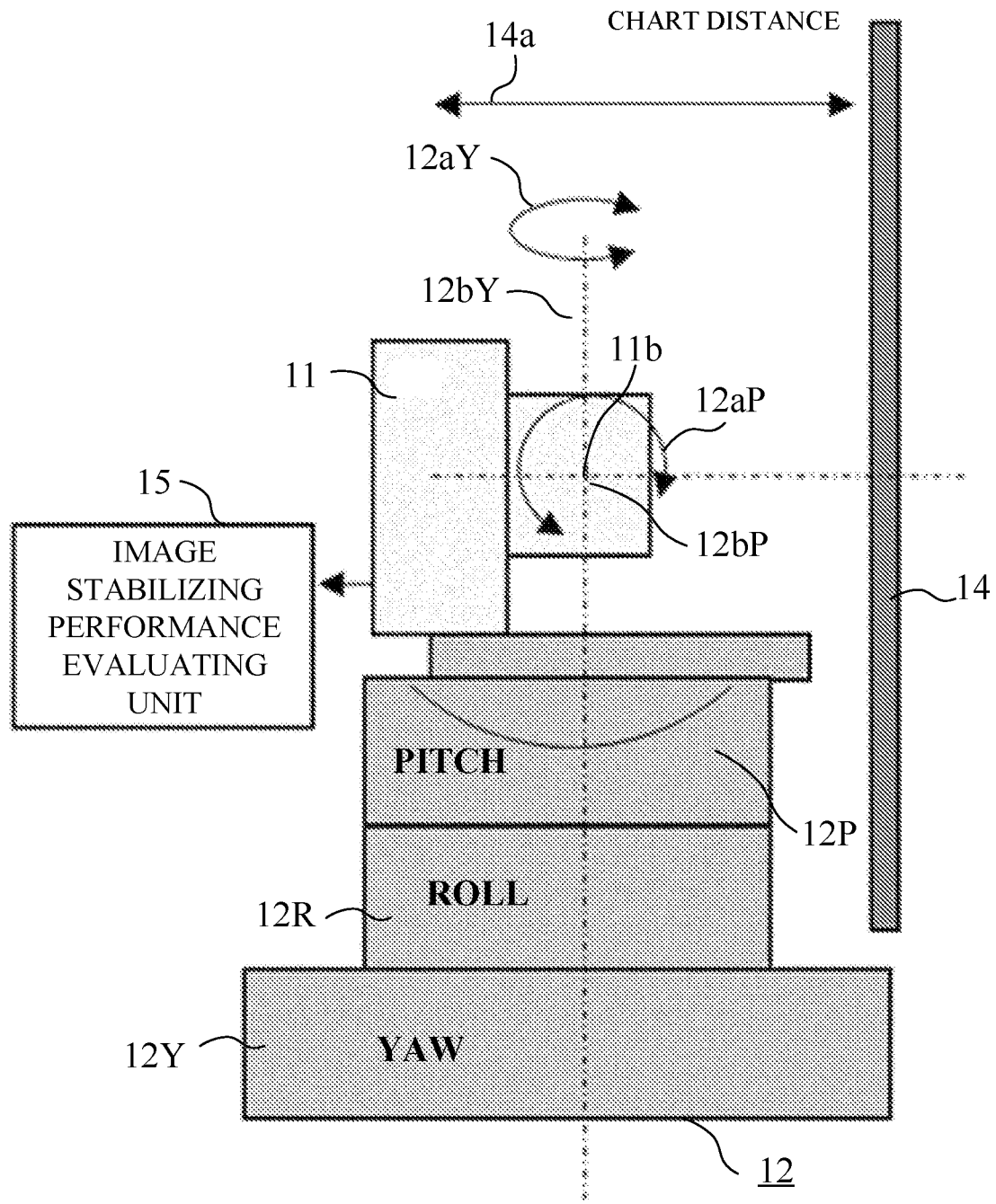
FIG. 25 explains angular blur measurement in the third embodiment.

A description will now be given of an evaluation method for image stabilizing performance in a state having no shift handheld blur. A difference between the measurement environment in FIG. 25 and the measurement environment in FIG. 1 is that the lens principal point position 11b and the excitation centers 12bP and 12bY coincide with each other. Without driving the excitation table 12RR, only the excitation tables 12P and 12Y are driven, and the flow described with reference to FIG. 22 is repeated to obtain the graph of FIG. 24B. FIG. 24B is an image stabilizing performance evaluation graph in a state where image deterioration caused by the shift handheld blur does not occur. The solid curve 2401b is a handheld blur curve obtained in a case where the image stabilizing function of the measurement camera 11 is turned on, and a broken curve 2402b is a theoretical handheld blur curve amount in a case where the image stabilizing function of the measurement camera 11 is turned off. Since image deterioration caused by the shift handheld blur does not occur, the theoretical handheld blur amount is a value that is not multiplied by the magnification illustrated in equation (5).

Exposure times C and D are read out of the graph, which are located at intersections between the predetermined permissible handheld blur amount threshold 2403 and the handheld blur curve 2402b in a case where the image stabilizing function is turned off and between the predetermined permissible handheld blur amount threshold 2403 and the handheld blur curve 2401b in a case where the image stabilizing function is turned on. An interval m (204b) representing the image stabilizing performance in a state where there is no image deterioration caused by the shift handheld blur is evaluated.

Since the image stabilizing performances can be evaluated with and without image deterioration caused by a handheld blur including a shift handheld blur from FIGS. 24A and 24B, the image stabilizing performance of the measurement camera 11 can be expressed as follows:

Image stabilizing performance: n steps (there is image deterioration caused by the shift handheld blur at an image magnification $\beta$); and Image stabilizing performance: m steps (there is no image deterioration caused by the shift handheld blur).

Alternatively, only image stabilizing performance against image deterioration caused by the shift handheld blur can be extracted from the handheld blur including the shift handheld blur and expressed as follows.

Shift handheld blur correction performance: m-n steps (at an image magnification $\beta$)

Thus, image stabilizing performance is evaluated by offsetting the lens principal point position from the excitation center of the excitation table 12 by a proper amount based on the method of obtaining the lens principal point position 11b in the measurement camera 11 and the obtained lens principal point position 11b. Thereby, image stabilizing performance can be evaluated with high accurately.

As described above, in this embodiment, the object (chart 14), the imaging unit (measurement camera 11) for imaging the object, the excitation unit (excitation table 12) onto which the imaging unit is fixed, which has the excitation center different from the lens principal point position of the imaging unit, and the image stabilizing performance evaluating unit 15. The image stabilizing performance evaluating unit 15 can evaluate the image stabilizing performance from the object image of the imaging unit obtained while the imaging unit is being excited by the excitation unit.

In addition, the image stabilizing performance evaluating unit 15 obtains the lens principal point position 11b of the imaging unit from an image deterioration amount caused by the shift handheld blur obtained by exciting the imaging unit (measurement camera 11) with offset from the excitation centers 12$b$P and 12$b$Y of the excitation table 12. The image stabilizing performance evaluating unit 15 sets and offsets the obtained lens principal point position 11$b$ and the excitation centers of the excitation table 12, and evaluates the image stabilizing performance caused by the angular handheld blur and shift handheld blur from image deterioration caused by the angular handheld blur and shift handheld blur in a case where the imaging unit is excited. Further, the image stabilizing performance evaluating unit 15 evaluates the image stabilizing performance due to the angular handheld blur from the image deterioration caused by the angular handheld blur in a case where the imaging unit is excited by according the lens principal point position 11$b$ with the excitation center of the excitation table 12. The image stabilizing performance evaluating unit 15 sets a difference from the image stabilizing performance due to the angular handheld blur and the shift handheld blur as the image stabilizing performance due to the shift handheld blur. The set offset amounts are L1=a(1+β)*f and L2=b (a=5 to 20, b=10 to 40). The distance between the object and the imaging unit is set so that the image magnification is 0.1 (10$f$).

Fourth Embodiment

Figure 26:
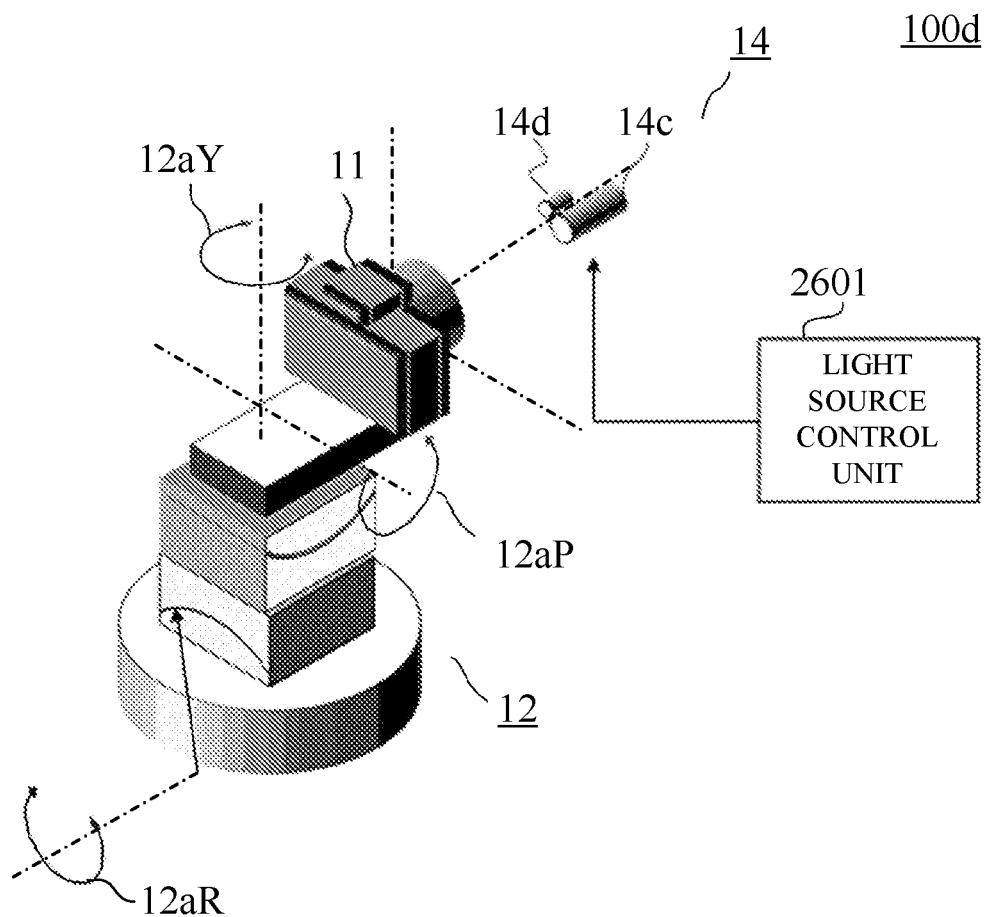
FIG. 26 is a perspective view of an evaluating apparatus according to a fourth embodiment.

A description will now be given of a fourth embodiment according to the present disclosure. FIG. 26 is a perspective view of an evaluating apparatus 100$d$ according to this embodiment. The evaluating apparatus 100$d$ has a configuration different from the configuration in FIG. 19C in that the chart 14, which is an object, has a collimated light source 14$c$1 and a point light source 14$d$ (non-collimated light source). A light source control unit 2601 controls lighting of the collimated light source 14$c$1 and the point light source 14$d$.

Assume that the light source control unit 2601 turns on the point light source 14$d$ and turns off the collimated light source 14$c$1. At this time, the point light source 14$d$ corresponds to the point image 14$a$ in the first embodiment, and the image stabilizing performance evaluating unit 15 can obtain the image stabilizing performance due to the shift handheld blur and the angular handheld blur illustrated in FIG. 24A. On the other hand, in a case where the light source control unit 2601 turns off the point light source 14$d$ and turns on the collimated light source 14$c$1, the image stabilizing performance evaluating unit 15 evaluates the image stabilizing performance due to only the angular blur illustrated in FIG. 24B. This is because the collimated light source 14$c$1 is parallel light and can be regarded as a light source from infinity. Therefore, in a case where the measurement camera 11 is focused on the collimated light source 14$c$1, the image magnification can be regarded as substantially zero, so even if shift handheld blur occurs, image deterioration does not occur. That is, as illustrated in FIG. 19A, even in a case where measurement is made while the lens principal point position 11$b$ is offset from the excitation centers 12$b$P and 12$b$Y, the object as the collimated light source 14$c$1 does not cause image deterioration due to the shift handheld blur.

Figure 27:
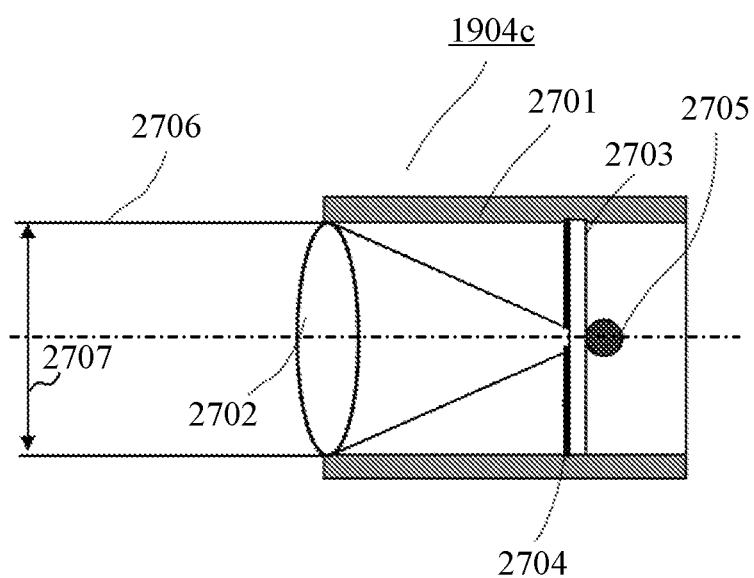
FIG. 27 explains a collimated light source in the fourth embodiment.

FIG. 27 is a sectional view of the collimated light source 14$c$1. The collimated light source 14$c$1 includes a lens barrel 2701, a lens 2702 fixed to the lens barrel 2701, an aperture stop (diaphragm) 2704 disposed at the focal length position of the lens 2702, a diffusion plate 2703 provided on the rear surface the aperture stop 2704, and a light source 2705. Since the aperture stop 2704 is provided at the focal length position of the lens 2702, a light beam 2706 emitted from the aperture stop 2704 passes through the lens 2702 and becomes parallel light (collimated light). The parallel light is an object light source located at an infinity position, and since the image magnification is inversely proportional to the imaging distance, the imaging magnification of the measurement camera 11 is extremely small. Therefore, an image magnification coefficient in equation (1) becomes zero, and a handheld blur amount on the image plane becomes a function only of the angular handheld blur and the focal length of the imaging optical system.

Here, the light beam 2706 in the collimated light source 14$c$1 ideally becomes a parallel light beam, but in practice the light beam spreads. In order to prevent this spread, it is necessary to minimize the size of the light beam emitted from the aperture stop 2704 and extend the focal length of the lens 2702. A diffusion plate 2703 is provided in front of a light source (LED) 2705 in order to eliminate unevenness in the light beam emitted from the aperture stop 2704. The light source 2705 may use a laser beam that is close to a point light source instead of an LED.

Thus, using the collimated light source 14$c$1 and the point light source 14$d$ eliminates the need to change the attachment position of the measurement camera 11 to the excitation table unlike the third embodiment, and can thereby eliminate measurement errors due to position change.

As described above, the evaluating apparatus according to this embodiment includes the plurality of objects (collimated light source 14$c$1 and point light source 14$d$) and the imaging unit (measurement camera 11) for imaging the objects. The evaluating apparatus includes the excitation unit (excitation table 12) onto which the imaging unit is fixed and which has the excitation center different from the lens principal point position of the imaging unit, and the image stabilizing performance evaluating unit 15 configured to evaluate a handheld blur from a plurality of object images of the imaging unit obtained while imaging unit is being excited by the excitation unit. The plurality of objects are the collimated light source 14$c$1 and the point light source 14$d$, and the light source control unit 2601 evaluates the camera shake due to the shift handheld blur and the angular handheld blur of the imaging unit in a case where the point light source is turned on, and evaluates the camera handheld blur due to the angular handheld blur of the imaging unit in a case where the collimated light source is turned on.

Fifth Embodiment

A description will now be given of a fifth embodiment according to the present disclosure. This embodiment provides an image stabilizing performance evaluating method due to normalized shift handheld blur, and evaluates image stabilizing performance for shift handheld blur regardless of image magnification or imaging distance. The configuration of the method for measuring a camera shake amount in this embodiment is the same as that in the third embodiment (FIG. 19), so a description thereof will be omitted. In this embodiment, the image stabilizing performance evaluating unit 15 can obtain an image magnification from image data captured by the measurement camera 11. Details will be described below.

Figure 28:
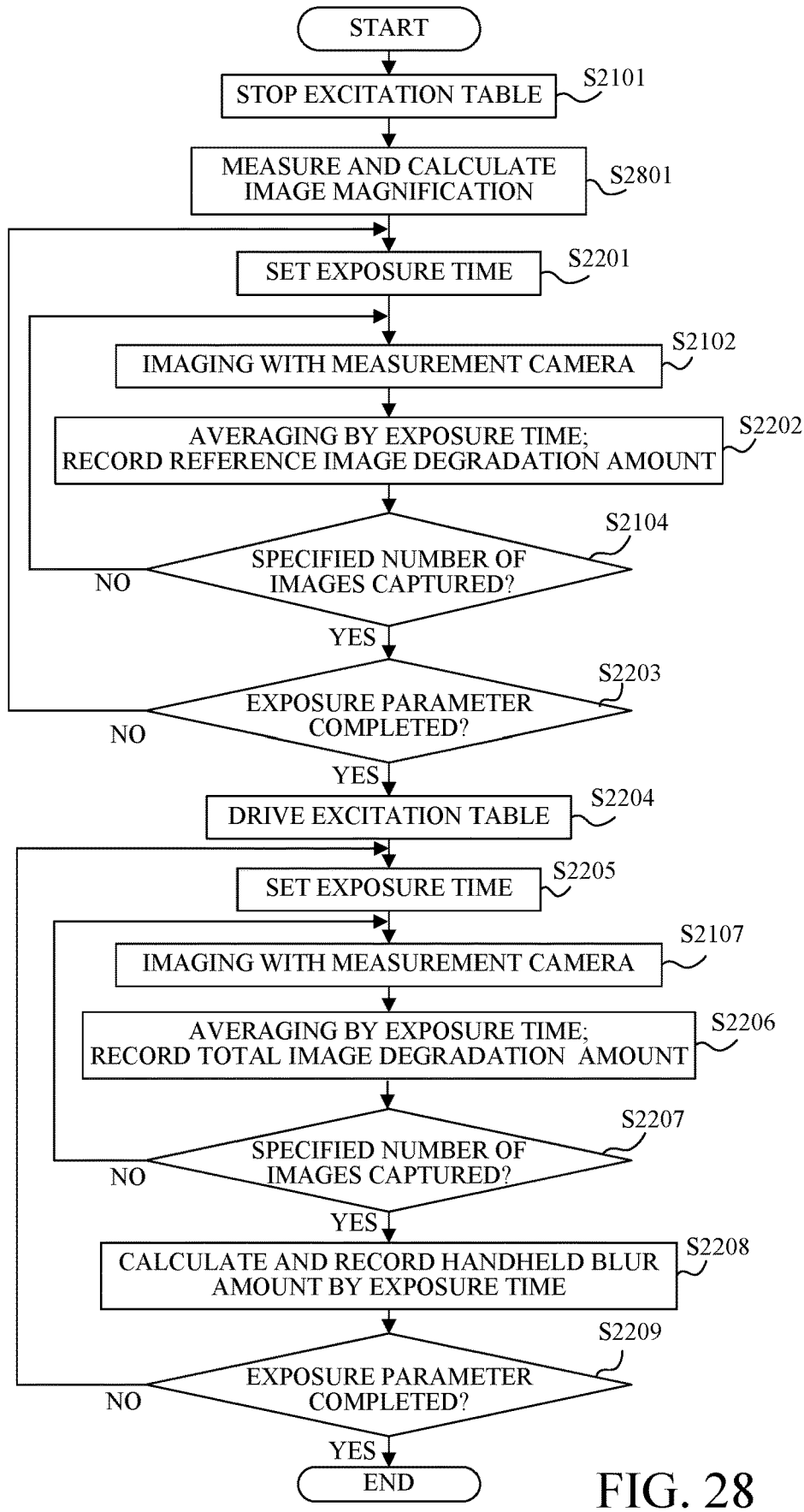
FIG. 28 is an image stabilizing performance evaluating flowchart according to a fifth embodiment.

Referring now to FIG. 28, a description will be given of a flow of an image stabilizing performance evaluating method for shift handheld blur. FIG. 28 is a simple flowchart for evaluating the image stabilizing performance of the measurement camera 11 by the image stabilizing performance evaluating unit 15. Those steps in FIG. 28, which are corresponding steps in FIG. 22, will be designated by the same step numerals and a description thereof will be omitted. Assume that the lens principal point position 11b of the measurement camera 11 has already been obtained. The lens principal point position 11b of the measurement camera 11 is set to a position that is distant from the excitation centers 12bP and 12bY of the excitation table 12 by L1 (offset PY (12cPY)) and distant from the excitation center 12bR by L2 (offset R (12cR)), as illustrated in FIG. 19.

In step S2801, the point image 14a is captured using the measurement camera 11 in which the excitation table is stopped and no handheld blur is set, and the image magnification β is calculated. In imaging the point image 14a, an object with a known length such as a scale is also captured, and the image stabilizing performance evaluating unit 15 reads the number of pixels of the object with the known length in the captured image data, and calculates and records the image magnification β. Since the image magnification is a ratio of the size of the object on the imaging plane to the size of the actual object, the following equation (6):

$$\beta = (Lk/Pk)/(Ls/Ps) \quad (6)$$

where Lk is the actual known length, Pk is the number of pixels of the known length on the imaging plane, Ls is a diagonal length of the imaging plane, and Ps is the number of pixels corresponding to the diagonal length of the imaging plane.

Ls and Ps use the diagonal lengths of the imaging plane, but in a case where there is a correspondence between the length and the number of pixels on the imaging plane, such as the vertical width or the horizontal width, these values may be used for the calculation instead. This step may be omitted in a case where the imaging distance is previously known.

In this flow, since the lens principal point position 11b and the excitation centers 12bP, 12bY, and 12bR do not match, a handheld blur amount as an image deterioration amount obtained in S2208 includes a shift handheld blur and an angular handheld blur. In order to acquire a handheld blur amount of only the shift handheld blur from this information, it is necessary to remove the angular handheld blur from the handheld blur amount obtained as described above. Therefore, this time, the lens principal point position 11b coincides with the excitation centers 12bP and 12bY, the excitation table 12RR is not driven, only the excitation tables 12P and 12Y are driven, and the flow described in FIG. 28 is repeated. Thereby, the handheld blur amount obtained in S2208 is only an angular handheld blur, so the handheld blur amount caused by the shift handheld blur can be obtained by subtracting the handheld blur amount obtained this time from the handheld blur amount previously obtained. In a case where the lens principal point position and the excitation center are matched, the image magnification or the object distance is adjusted to the condition at the time of the previous measurement in which the lens principal point position and the excitation center are separated.

Referring now to FIG. 29A, a description will be given of a method for calculating a theoretical shift handheld blur amount. FIG. 29A is an image stabilizing performance evaluation graph in a state in which image deterioration occurs only due to the shift handheld blur at the image magnification β. A horizontal axis represents exposure time, and the exposure time increases toward the right. A vertical axis represents a handheld blur amount. A solid curve 2901a is a shift handheld blur curve in a case where the image stabilizing function of the measurement camera 11 is turned on, and is a curve due to a shift handheld blur obtained by the method described in the previous explanation of the flow. A dashed curve 2902a is a theoretical shift handheld blur amount curve in a case where the image stabilizing function of the measurement camera 11 is turned off. A method for calculating the theoretical shift handheld blur amount will be described below. A solid line 2903 is a predetermined permissible handheld blur amount threshold. Reference numeral 2904a denotes an interval "s" between exposure times E and F.

As described in the third embodiment, the shift handheld blur is determined by the relationship between the moving amount Y (1901x, 1901y, 1901r) of the lens principal point position 11b and the image magnification. In a case where a camera in which the image stabilizing function is turned off is excited by the excitation table, a shift handheld blur amount that occurs on the imaging plane of the camera is a moving amount of the lens principal point caused by the excitation component that coincides with the in-plane direction, multiplied by the image magnification. Therefore, in a case where a rotation angle of the excitation waveform data is small, a theoretical shift handheld blur amount Yth can be obtained from equations (1), (2), and (3) as follows:

$$Yth = \beta * Yt = \beta * (Yxt^2 \pm Yyt^2)^{(1/2)} \quad (7)$$

$$Yxt = L1 \times \theta t1 \quad (8)$$

$$Yyt = L1 \times \theta t2 + L2 \times \theta t3 \quad (9)$$

where Yt is a moving amount in the image plane direction by the excitation waveform data, Yxt is a sum of moving amounts by the excitation waveform data in the arrows 1901x and 1901r directions, Yyt is a moving amount by the excitation waveform data in the arrow 1901y direction, θt1 is a rotation angle of the excitation waveform data around P, θt2 is a rotation angle of the excitation waveform data around Y, and θt3 is a rotation angle of the excitation waveform data around R.

A broken handheld blur curve 2902a in FIG. 29A is a graphical representation of a theoretical shift handheld blur amount obtained at each exposure time from equation (7). In reading the shift handheld blur correction performance at the image magnification β from FIG. 29A, the exposure times E and F may be read out of the graph, which are located at intersections between the handheld blur curve 2902a in a case where the image stabilizing function is turned off and a predetermined permissible handheld blur amount threshold 2903 and between the handheld blur curve 2901a in a case where the image stabilizing function is turned on and the predetermined permissible handheld blur amount threshold 2903. As an interval s (2904a) between the exposure times E and F becomes longer, the image stabilizing performance of the shift handheld blur of the camera becomes higher.

Referring now to FIG. 29B, a description will be given of a shift handheld blur normalization method. FIG. 29B is an image stabilizing performance evaluation graph obtained by normalizing each shift handheld blur in FIG. 29A. A horizontal axis represents exposure time, and a vertical axis represents a handheld blur amount. A solid curve 2901b is a shift handheld blur curve obtained by normalizing the curve 2901a in FIG. 29A. A dashed curve 2902b is a theoretical shift handheld blur amount curve obtained by normalizing the curve 2902a in FIG. 29A. Reference numeral 2904b denotes an interval t between exposure times G and H.

As mentioned above, the shift handheld blur that occurs on the image plane of the camera is expressed by multiplying the moving amount of the lens principal point by the image magnification. Hence, even if the moving amount of the lens principal point is the same, a value of the shift handheld blur on the image plane changes in a case where the image magnification becomes different. On the other hand, the third and fourth embodiments make constant the image magnification to enable the handheld blur amounts δ including the shift handheld blur to be compared under the same conditions, but the comparison under the same conditions is not always available. Therefore, in order to uniformly compare shift handheld blurs regardless of the image magnification, it is necessary to normalize the image degradation amount. The theoretical shift handheld blur amount Yth and the shift handheld blur δy are normalized by the following equations (10) and (11):

$$Ytn = Yth/\beta \tag{10}$$

$$\delta yn = \delta y/\beta \tag{11}$$

where Ytn is a normalized theoretical shift handheld blur amount, and δyn is a normalized shift handheld blur amount.

Thereby, the theoretical shift handheld blur amount Yt and the shift handheld blur δy can be compared regardless of the image magnification β. Since the image magnification is inversely proportional to the imaging distance, the shift handheld blur amount may be normalized using the imaging distance instead of the image magnification. Since the imaging distance and the image magnification do not have a perfect one-to-one correspondence relationship, the normalized values are different.

The broken handheld blur curve 2902b in FIG. 29B is a graphical representation of a normalized theoretical shift handheld blur amount at each exposure time from equation (10). The solid handheld blur curve 2901b is a graphical representation of a normalized shift handheld blur amount in a case where the image stabilizing function of the camera is turned on by using equation (11). In reading the normalized shift handheld blur correction performance from FIG. 29B, the exposure times G and H may be read out from the graph, which are located at the intersections between a handheld blur curve 2902b in a case where the image stabilizing function is turned off and a predetermined permissible handheld blur amount threshold 2903 and between a handheld blur curve 2901b in a case where the image stabilizing function is turned on and the predetermined permissible handheld blur amount threshold 2903. An interval t (2904b) between the exposure times G and H becomes longer, the image stabilizing performance of the shift handheld blur of the camera becomes higher.

The above method can evaluate the image stabilizing performance of shift handheld blur regardless of an image magnification or imaging distance. This embodiment may obtain a shift handheld blur based on the configuration of the third embodiment, but may obtain a shift handheld blur using the configuration of the fourth embodiment.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can provide an evaluating apparatus, an evaluating method, and a storage medium, each of which can evaluate the image stabilizing performance around the optical axis of the imaging unit with high accuracy. Each embodiment can provide a method for manufacturing the imaging unit that can provide highly accurate image stabilization.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An evaluating apparatus configured to evaluate image stabilizing performance of an imaging unit around an optical axis, the evaluating apparatus comprising:
   an object disposed to face the imaging unit, the object having a first feature point at a position different from the optical axis of the imaging unit;
   an excitation unit configured to excite the imaging unit;
   an evaluating unit configured to evaluate an image of the object captured by the imaging unit that is being excited by the excitation unit, and
   a scanner configured to scan the object,
   wherein the object has a second feature point at a position different from the first feature point, and
   wherein the evaluating unit evaluates, as the image, a single locus image regarding the first feature point and the second feature point captured by the imaging unit that is being excited by the excitation unit.

2. The evaluating apparatus according to claim 1, wherein the evaluating unit evaluates the image stabilizing performance around the optical axis of the imaging unit by using an average value of handheld blurs regarding the first feature point and the second feature point.

3. The evaluating apparatus according to claim 1, further comprising measuring unit configured to acquire a first locus of a center of gravity of the first feature point and a second locus of a center of gravity of the second feature point from the single locus image captured by the imaging unit, and
   wherein the evaluating unit evaluates the image stabilizing performance around the optical axis based on the first locus of the center of gravity and the second locus of the center of gravity.

4. The evaluating apparatus according to claim 3, wherein the measuring unit acquires a difference locus between the first locus of the center of gravity and the second locus of the center of gravity, and
wherein the evaluating unit evaluates the image stabilizing performance around the optical axis based on the difference locus.

5. The evaluating apparatus according to claim 3, wherein the measuring unit determines whether a measurement environment is proper based on an added locus of the first locus of the center of gravity and the second locus of the center of gravity.

6. An evaluating method configured to evaluate image stabilizing performance around an optical axis of an imaging unit, the evaluating method comprising the steps of:
disposing an object to face the imaging unit, the object having a first feature point at a position different from the optical axis of the imaging unit;
exciting the imaging unit using an excitation unit;
evaluating an image of the object captured by the imaging unit that is being excited by the excitation unit, and scanning the object,
wherein the object has a second feature point at a position different from the first feature point, and
wherein the evaluating evaluates, as the image, a single locus image regarding the first feature point and the second feature point captured by the imaging unit that is being excited by the excitation unit.

7. A non-transitory computer-readable storage medium storing a program that causes a computer to execute the evaluating method according to claim 6.

8. A manufacturing method of an imaging unit, the manufacturing method comprising the steps of:
disposing an object to face the imaging unit, the object having a first feature point at a position different from an optical axis of the imaging unit;
exciting the imaging unit using an excitation unit;
evaluate an image of the object captured by the imaging unit that is being excited by the excitation unit, and scanning the object,
wherein the object has a second feature point at a position different from the first feature point, and
wherein the evaluating evaluates, as the image, a single locus image regarding the first feature point and the second feature point captured by the imaging unit that is being excited by the excitation unit.

* * * * *